United States Patent
Gomi

(10) Patent No.: US 10,308,051 B2
(45) Date of Patent: Jun. 4, 2019

(54) MEASUREMENT DEVICE AND PRINTING APPARATUS

(71) Applicant: Seiko Epson Corporation, Tokyo (JP)

(72) Inventor: Tsugio Gomi, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/466,229

(22) Filed: Mar. 22, 2017

(65) Prior Publication Data

US 2017/0334221 A1 Nov. 23, 2017

(30) Foreign Application Priority Data

May 20, 2016 (JP) ................................. 2016-101385

(51) Int. Cl.
| | | |
|---|---|---|
| *G01J 3/02* | (2006.01) | |
| *G01J 3/10* | (2006.01) | |
| *B41J 13/00* | (2006.01) | |
| *G01J 3/50* | (2006.01) | |
| *G01J 3/26* | (2006.01) | |

(52) U.S. Cl.
CPC .......... *B41J 13/0009* (2013.01); *G01J 3/021* (2013.01); *G01J 3/0202* (2013.01); *G01J 3/027* (2013.01); *G01J 3/0289* (2013.01); *G01J 3/10* (2013.01); *G01J 3/26* (2013.01); *G01J 3/50* (2013.01); *G01J 2003/102* (2013.01)

(58) Field of Classification Search
None
See application file for complete search history.

(56) References Cited

U.S. PATENT DOCUMENTS

| | | | |
|---|---|---|---|
| 2007/0047157 A1* | 3/2007 | Miyahara | B41J 11/009 |
| | | | 360/324.11 |
| 2009/0091760 A1 | 4/2009 | Ehbets et al. | |
| 2010/0277728 A1 | 11/2010 | Imura | |
| 2015/0260579 A1* | 9/2015 | Toriumi | G01N 21/255 |
| | | | 356/402 |

FOREIGN PATENT DOCUMENTS

| | | |
|---|---|---|
| JP | 2005-059552 A | 3/2005 |
| JP | 2006-227012 A | 8/2006 |
| JP | 2010-281808 A | 12/2010 |
| WO | WO-2011-142107 A1 | 11/2011 |

* cited by examiner

*Primary Examiner* — Scott A Richmond

(74) *Attorney, Agent, or Firm* — Harness, Dickey & Pierce, P.L.C.

(57) ABSTRACT

A measurement device includes a light source that radiates an illumination light on a measurement object; and a measurement unit that measures a measurement light that is reflection light obtained by the illumination light being reflected by the measurement object or transmitted light obtained by the illumination light passing through the measurement object. The illumination light is a plurality of illumination lights. In a case where the measurement object is positioned at a reference position, an illumination center at which an optical axis of each of the plurality of illumination lights and the measurement object intersect, and a measurement center that is a center of a measurement region of the measurement object measured by the measurement unit are positioned at different positions.

18 Claims, 15 Drawing Sheets

MEASUREMENT DEVICE AND PRINTING APPARATUS

BACKGROUND

1. Technical Field

The present invention relates to a measurement device, a printing apparatus, and the like.

2. Related Art

In image forming apparatuses, such as a printer, in the related art, a device provided with a colorimetry device that measures the color of a measurement object is known (for example, JP-A-2005-59552).

The device disclosed in JP-A-2005-59552 is provided with a light source that radiates an illumination light on the measurement object, and measures the light reflected by the light source with a measuring device. The device disclosed in JP-A-2005-59552 includes a focal position of the illumination light that is set behind (opposite side to the measuring device) of the measurement object. In this case, the fluctuation amount in the light intensity of light received by the measuring device can be reduced and lowering of the measurement precision can be suppressed, even in a case where swelling (cockling) or the like arises due to the influence of humidity or temperature or the action of physical external forces.

Incidentally, in a case of performing colorimetry with a colorimeter, colorimetry is ordinarily carried out according to geometric conditions stipulated by the colorimetry standards (JIS Z 8722), that is, the measurement object is irradiated with illumination light at 45 degrees and the reflection light reflected at 90 degrees is measured by the measuring device (45/0° colorimetry system), or the measurement object is irradiated with illumination light at 90 degrees and the reflection light reflected at 45 degrees is measured by the measuring device (0/45° colorimetry system).

In this case, in a case where cockling or the like arises in the measurement object, and the position of the measurement object fluctuates, the distance between the measurement object and the colorimeter, and the measurement object and the light source fluctuates. Therefore, the position of the illumination region at which the measurement object is irradiated with illumination light or the measurement region able to be measured with the measuring device fluctuates. For example, although the measurement region does not fluctuate in the 45/0° colorimetry system, the illumination region moves in a direction approaching and separating with respect to the light source according to the displacement direction of the position of the measurement object. Additionally, although the illumination region does not fluctuate in the 0/45° colorimetry system, the measurement region moves in a direction approaching and separating with respect to the colorimeter.

In this way, when the illumination region or the measurement region moves, because the light quantity of illumination light fluctuates in the portion where the measurement region and the illumination region are superimposed, a problem arises where the light quantity of the measurement light incident on the measuring device also fluctuates and it is difficult to carry out colorimetry with high precision.

SUMMARY

An advantage of some aspects of the invention is to provide a measurement device and a printing apparatus capable of high precision measurement.

According to an application example of the invention, there is provided a measurement device including a light source that radiates an illumination light on a measurement object; and a measurement unit that measures a measurement light that is reflection light obtained by the illumination light being reflected by the measurement object or transmitted light obtained by the illumination light passing through the measurement object. The illumination light is a plurality of illumination lights. In a case where the measurement object is positioned at a reference position, an illumination center at which an optical axis of each of the plurality of illumination lights and the measurement object intersect, and a measurement center that is a center of a measurement region of the measurement object measured by the measurement unit are positioned at different positions.

In the application example, when the measurement object is positioned at the reference position, that is, in a case where cockling or the like does not occur in the measurement object and a distance between the measurement object and the measurement unit is a reference distance, the illumination center of each of the plurality of illumination lights and the measurement center are shifted from each other and are positioned at different positions. In the configuration, in a case where cockling or the like occurs in the measurement object, any one of the illumination centers of the plurality of illumination lights approaches the measurement center so that inconveniences such as a decrease in the light quantity irradiated to the measurement region can be suppressed and measurement can be performed with high precision.

In the measurement device of the application example, it is preferable that the plurality of illumination lights be a first illumination light and a second illumination light, and an optical axis of the first illumination light and an optical axis of the second illumination light intersect at a predetermined intersection point, and the intersection point be included in the measurement region when viewed from a normal direction of the measurement object.

In the application example, the optical axes of the first illumination light and the second illumination light intersect each other, and the intersection point is included in the measurement region when viewed from the normal direction of the measurement object. That is, the first illumination light and the second illumination light are applied so as to face each other in the measurement region when viewed from the normal direction of the measurement object. That is, the first illumination light and the second illumination light are configured to be respectively applied from different directions from each other toward the measurement region and even in a case where cockling or the like occurs, any one of the first illumination light and the second illumination light can be applied to the measurement region. Therefore, fluctuation of the light quantity can be suppressed and lowering of the measurement precision can be suppressed.

In the measurement device of the application example, it is preferable that when the measurement object is positioned at the reference position, a first illumination center at which the optical axis of the first illumination light and the measurement object intersect, and a second illumination center at which the optical axis of the second illumination light and the measurement object intersect be positioned at shifted positions in the same direction with respect to the measurement center.

In the application example, when the measurement object is positioned at the reference position, the first illumination center and the second illumination center are shifted in the same direction with respect to the measurement center. In this case, in a case where the measurement object moves in a direction approaching the measurement device (measurement unit), one of the first illumination center and the second illumination center approaches the measurement center, and in a case where the measurement object moves in a direction away from the measurement device, the other of the first illumination center and the second illumination center approaches the measurement center. Therefore, when cockling or the like occurs, fluctuation of the light quantity can be further suppressed and lowering of the measurement precision can be further suppressed.

In the measurement device of the application example, it is preferable that when the measurement object is positioned at a position closer to the measurement unit by a predetermined dimension from the reference position, the first illumination center at which the optical axis of the first illumination light and the measurement object intersect, and the measurement center match.

Here, as the predetermined dimension, for example, it is possible to set an allowable movement amount of the measurement object or the like in a case where cockling or the like occurs.

In the application example, when the measurement object moves to the measurement unit (measurement device) side, the first illumination center moves in a direction approaching the measurement center and when the predetermined dimension is reached, the first illumination center and the measurement center match. In this case, the second illumination center moves in the direction away from the measurement center. However, as described above, the first illumination center and the measurement center match so that the measurement region is irradiated with the first illumination light with a sufficient light quantity. Therefore, lowering of the measurement precision can be suppressed.

In the measurement device of the application example, it is preferable that when the measurement object is positioned at a position away from the reference position by a predetermined dimension in a side opposite to the measurement unit, the second illumination center at which the optical axis of the second illumination light and the measurement object intersect, and the measurement center match.

Here, as the predetermined dimension, similar to the above description, for example, it is possible to set an allowable movement amount of the measurement object in a case where cockling or the like occurs.

In the application example, when the measurement object moves to the side opposite to the measurement unit (measurement device), the second illumination center moves in the direction approaching the measurement center and when the predetermined dimension is reached, the second illumination center and the measurement center match. In this case, the first illumination center moves in the direction away from the measurement center. However, similar to the above description, the second illumination center and the measurement center match so that the measurement region is irradiated with the second illumination light with a sufficient light quantity. Therefore, lowering of the measurement precision can be suppressed.

In the measurement device of the application example, it is preferable that the measurement device further include a carriage on which the light source and the measurement unit are mounted; and a moving mechanism that relatively moves the carriage with respect to the measurement object in a first direction. It is preferable that the optical axes of the plurality of illumination lights be a second direction intersecting the first direction when viewed from the normal direction of the measurement object.

In the application example, when viewed from the normal direction of the measurement object, the optical axes of the plurality of illumination lights are disposed along the second direction intersecting the first direction in which the light source and the measurement unit are relatively moved. Particularly, in a case where color patches disposed side by side along the first direction are measured by using the measurement device, in a case where the optical axis of each illumination light is the first direction (along the first direction) when viewed from the normal direction of the measurement object, if the distance between the measurement object and the measurement unit (measurement device) fluctuates due to occurrence of cockling or the like, an irradiation range of the illumination light moves along the first direction. In this case, there is a high possibility that another color patch adjacent to the color patch that is the measurement target is irradiated with light. If reflection light from the adjacent color patch is incident on the measurement unit, the measurement precision with respect to the color patch of the measurement target is lowered. In contrast, in the application example, since the optical axis of each illumination light is the second direction (along the second direction) when viewed from the normal direction of the measurement object, if cockling or the like occurs, the irradiation range of the illumination light moves along the second direction. In this case, a color patch which is adjacent to the color patch of the measurement target along the first direction is not irradiated with light. Therefore, lowering of the measurement precision can be suppressed.

In addition, as described above, when measuring the color patch, it is also conceivable to increase a width dimension along the first direction of the color patch so that the adjacent color patch is not irradiated with light. However, in this case, for example, the number of the color patches that can be disposed along the first direction with respect to a paper surface is reduced. Therefore, for example, it is necessary to form many color patch groups over the second direction and accordingly, a time required for the measurement also increases. In contrast, in the application example, since it is not necessary to increase the width direction along the first direction of the color patch, it is possible to dispose many color patches along the first direction and to shorten the time required for the measurement.

According to another application example of the invention, there is provided a measurement device including a light source that radiates an illumination light on a measurement object; and a plurality of measurement units that measure a measurement light that is reflection light obtained by the illumination light being reflected by the measurement object or transmitted light obtained by the illumination light passing through the measurement object. In a case where the measurement object is positioned at a reference position, an illumination center at which an optical axis of the light source and the measurement object intersect, and a measurement center that is a center of a measurement region of the measurement object measured by each of the plurality of measurement units are positioned at different positions.

In the application example, when the measurement object is positioned at the reference position, the measurement center of each of the plurality of measurement units and the illumination center are shifted from each other, and are respectively positioned at different positions. In the configuration, similar to the application example described above, in a case where cockling or the like occurs in the measurement object, any one of the measurement centers of the plurality of measurement units approaches the illumination center. Therefore, even if the measurement precision of any one of the plurality of measurement units is lowered, lowering of the measurement precision of the other measurement units can be suppressed. If a measurement result in the measurement unit in which lowering of the measurement precision is suppressed is employed, the measurement can be performed with high precision.

According to still another application example of the invention, there is provided a printing apparatus including the above-described measurement device, and an image forming unit that forms an image on the measurement object.

In the application example, the measurement device and the image forming unit are provided. In such a printing apparatus, measurement can be performed using the measurement device with respect to an image (for example, the color patch or the like) formed by the image forming unit. Therefore, for example, after printing an image on the measurement object, it is possible to omit a troublesome operation such as transfer of the measurement object to the measurement device and to immediately perform the measurement with high precision with respect to the printed image.

In the printing apparatus of the application example, it is preferable that the printing apparatus further include a carriage on which the image forming unit and the measurement device are mounted; and a moving mechanism that relatively moves the carriage with respect to the measurement object.

In the application example, the image forming unit and the measurement device are mounted on the same carriage, and the carriage is moved by the moving mechanism. Therefore, it is possible to change an image forming position or a measurement position. In this case, the configuration can be simplified and miniaturization of the printing apparatus can be promoted compared to a case where a carriage for the image forming unit and a carriage for the measurement device are respectively used.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
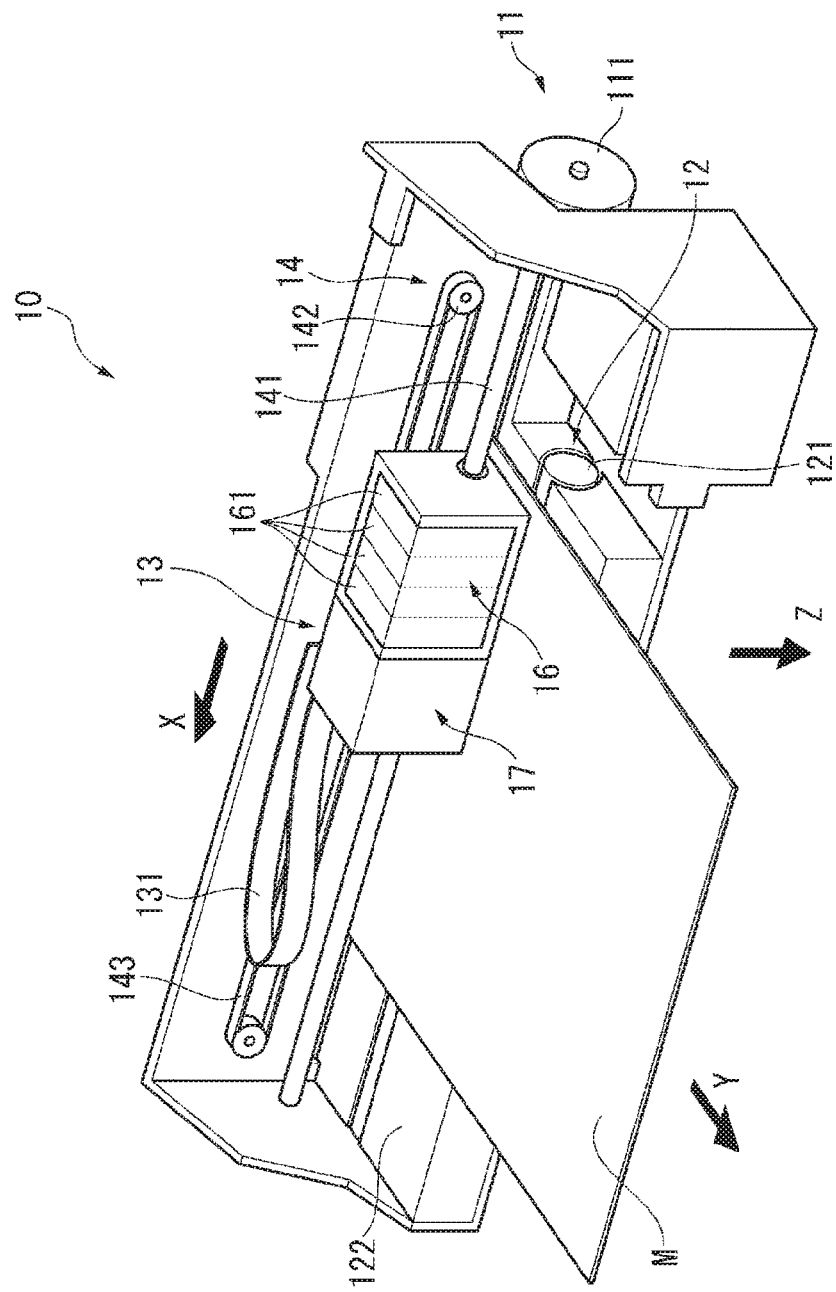
FIG. 1 is a drawing illustrating a configuration example of an external appearance of a printer of a first embodiment.
Figure 2:
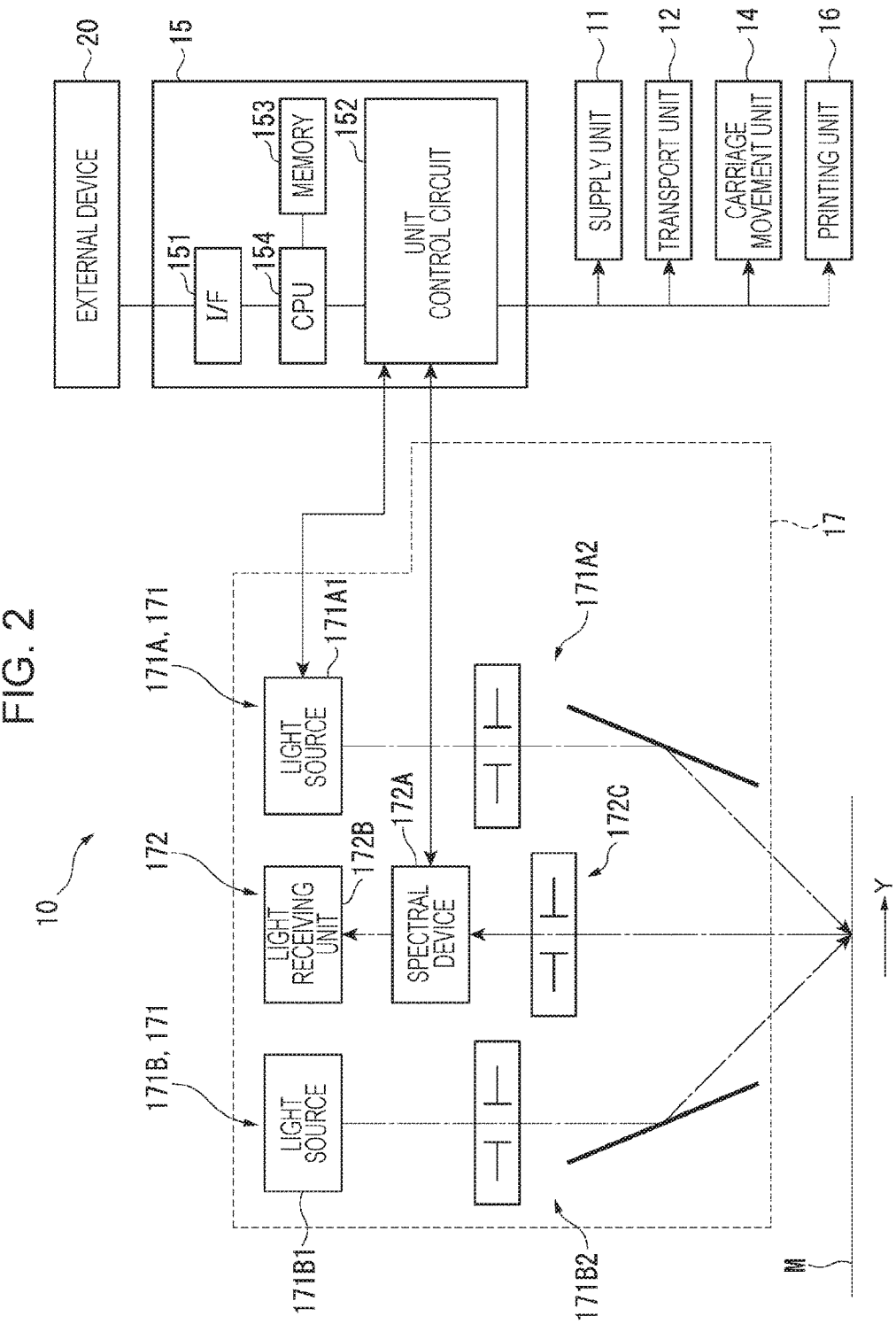
FIG. 2 is a block diagram illustrating a schematic configuration of the printer of the first embodiment.

Below, the first embodiment according to the invention will be described based on the drawings. In the embodiment, a printer 10 (ink jet printer) provided with the measurement device will be described below as an example of the printing apparatus of the invention.
Schematic Configuration of Printer FIG. 1 is a drawing illustrating a configuration example of an external appearance of the printer 10 of the first embodiment. FIG. 2 is a block diagram illustrating a schematic configuration of the printer 10 of the embodiment.

As illustrated in FIG. 1, the printer 10 is provided with a supply unit 11, a transport unit 12, a carriage 13, a carriage movement unit 14, and a control unit 15 (refer to FIG. 2). The printer 10 controls each unit 11, and 14, and the carriage 13 and prints an image on a medium M (measurement object) based on printing data input from an external device 20, such as a personal computer. The printer 10 of the embodiment forms a color patch for colorimetry at a predetermined position on the medium M based on the printing data for calibration that is set in advance and performs spectral measurement on the color patch. Accordingly, the printer 10 compares an actual measured value on the color patch and the printing data for calibration, determines whether there is a color shift in a printed color, and performs color correction base on the actual measured value in a case where there is a color shift.

Below, each configuration of the printer 10 will be specifically described.

The supply unit 11 is a unit that supplies a medium M (in the embodiment, a sheet is given as an example) that is an image formation object to an image forming position. The supply unit 11 is provided with a roll member 111 on which the medium M is wound (refer to FIG. 1), a roll driving motor (not shown), a roll drive wheel train (not shown), and the like. The roll driving motor is driven to rotate based on instructions from the control unit 15, and rotational power of the roll driving motor is transmitted to the roll member 111 via the roll drive wheel train. Accordingly, the roll member 111 rotates and the sheet wound on the roll member 111 is supplied to the downstream side (+Y direction) in the Y direction (sub-scanning direction).

It should be noted that although an example in which the sheet wound on the roll member 111 is supplied is illustrated in the embodiment, there is no limitation thereto. For example, the medium M may be supplied by any supply method, such as supplying the media M, such a sheet stacked on a tray or the like, one at a time with a roller or the like.

The transport unit 12 transports the medium M supplied from the supply unit 11 along the Y direction. The transport unit 12 is formed including a transport roller 121, a driven roller (not shown) that is arranged interposing a medium M with the transport roller 121 and that is driven by the transport roller 121, and a platen 122.

When the driving power is transmitted from the transport motor, not shown, and the transport motor is driven according to the control of the control unit 15, the transport roller 121 is driven to rotate by the rotational power and transports the medium M along the Y direction in a state where the medium M is pinched with the driven roller. The platen 122 that faces the carriage 13 is provided on the downstream side (+Y side) in the Y direction of the transport roller 121.

The carriage 13 is equipped with a printing unit 16 that prints an image on the medium M and a spectrometer 17 (measurement device) that performs spectral measurement of a predetermined measurement position (measurement region) on the medium M.

The carriage 13 is provided to be movable along a main scanning direction (X direction) that intersects the Y direction by the carriage movement unit 14.

The carriage 13 is connected to the control unit 15 by a flexible circuit 131, and carries out the printing processing (image forming processing with respect to the medium M) with the printing unit 16 mounted on the carriage and the light quantity measurement processing with the spectrometer 17 mounted on the carriage 13 based on instructions from the control unit 15.

The detailed configuration of the carriage 13 will be described later.

The carriage movement unit 14 forms a movement mechanism in the invention, and causes the carriage 13 to reciprocate along the X direction based on instructions from the control unit 15.

The carriage movement unit 14 is formed including a carriage guide shaft 141, a carriage motor 142, and a timing belt 143.

The carriage guide shaft 141 is arranged along the X direction and both end portions are fixed to, for example, a housing of the printer 10. The carriage motor 142 causes the timing belt 143 to be driven. The timing belt 143 is supported to be substantially parallel to the carriage guide shaft 141, and is fixed to one portion of the carriage 13. When the carriage motor 142 is driven based on the instructions of the control unit 15, the timing belt 143 is run forward and rearward, and the carriage 13 fixed to the timing belt 143 reciprocates guided on the carriage guide shaft 141.

Next, the configuration of the printing unit 16 and the spectrometer 17 provided on the carriage 13 will be described.

Configuration of Printing Unit (Image Forming Unit)

The printing unit 16 is the image forming unit of the invention and individually discharges ink on the medium M at a portion that faces the medium M, and forms an image on the medium M.

The printing unit 16 has ink cartridges 161 corresponding to a plurality of colors of ink that are mounted to be freely detachable, and the ink is supplied via a tube (not shown) from each ink cartridge 161 to an ink tank (not shown). Nozzles (not shown) that discharge ink droplets are provided in a lower surface (position facing the medium M) of the printing unit 16 corresponding to each color. For example, a piezoelectric element is arranged in the nozzles, and an ink droplet that is supplied from the ink tank is discharged by the piezoelectric element being driven and lands on the medium M, thereby forming a dot.

Configuration of Spectrometer

The spectrometer 17 corresponds to the measurement device and is provided with a light source unit 171 and a measurement unit 172 as illustrated in FIG. 2.

The spectrometer 17 radiates an illumination light from the light source unit 171 onto the medium M, and the reflection light reflected by the medium M is received by the measurement unit 172. A spectral device 172A provided in the measurement unit 172 is capable of selecting a transmitted wavelength based on control of the control unit 15, and is capable of spectral measurement of the medium M by measuring the light quantity of light for each wavelength in visible light.

It should be noted that spectral measurement in the embodiment is carried out according to the format (45/0° colorimetry system) of the optical geometric conditions stipulated by the colorimetry standards (JIS Z 8722). That is, in the embodiment, the illumination light from the light source unit 171 is made incident at an angle of 45° (angle of 45°±2°) with respect to the normal line of the medium M, and the light reflected in the normal direction (angle within 10° in the normal direction) of the medium M is received by the measurement unit 172. That is, the illumination direction of an illumination light toward the medium M and the measurement direction of a measurement light toward the measurement unit 172 are different.

Configuration of Light Source Unit

As illustrated in FIG. 2, the light source unit 171 includes a first light source unit 171A (first light source) and a second light source unit 171B (second light source). The first light source unit 171A, the second light source unit 171B, and the measurement unit 172 which is described below are disposed along the Y direction. Specifically, the first light source unit 171A is disposed on a +Y side of the measurement unit 172 and the second light source unit 171B is disposed on a −Y side of the measurement unit 172.

The first light source unit 171A includes a light source 171A1 and an illumination optical member 171A2, and radiates light on the medium M at an angle of 45° with respect to the normal line of the medium M, for example, from the +Y side to the −Y side.

The second light source unit 171B includes a light source 171B1 and an illumination optical member 171B2, and radiates light on the medium M at an angle of 45° with respect to the normal line of the medium M, for example, from the −Y side to the +Y side.

The light sources 171A1 and 171B1 are members emitting the illumination light applied to the medium M. In the embodiment, the spectrometer 17 is mounted on the carriage 13 of the printer 10 and it is necessary to reduce a size and a weight of the spectrometer 17. Therefore, as the light sources 171A1 and 171B1, it is preferable that an LED, an LD (semiconductor laser), or the like be used.

The illumination optical members 171A2 and 171B2 are optical members which determine an irradiation direction and an irradiation range of the illumination light applied from the light sources 171A1 and 171B1, and for example, are configured of optical members such as a single or a plurality of apertures, lenses, and mirrors. For example, as the illumination optical members 171A2 and 171B2, a configuration, in which a single or a plurality of apertures are provided and the medium M is irradiated with the illumination light of a predetermined optical path passing through the apertures, can be exemplified. As the illumination optical member 171B2, a collimator lens may be provided. In this case, the illumination light parallel to the medium M is capable of being applied from the light source unit 171 and even in a case where the position of the medium M is displaced in the Z direction, it is possible to suppress fluctuation of a size (spot diameter) of the illumination region on the medium M.

Descriptions about a region (illumination region) on the medium M illuminated with the illumination light from the first light source unit 171A and the second light source unit 171B, and a center (illumination center) thereof will be described later.

In the description of the embodiment described later, although a configuration, in which the medium M is irradiated with two illumination lights by two light sources of the first light source unit 171A and the second light source unit 171B, is described, even with one light source, a plurality of illumination lights may be obtained by a beam splitter such as a half mirror. In this case, if the illumination region and the illumination center of the plurality of illumination lights satisfy conditions of description described later, the same effect can be obtained.

Configuration of Measurement Unit

As illustrated in FIG. 2, the measurement unit 172 is provided with the spectral device 172A, a light receiving unit 172B, a light receiving optical member 172C, and the like.

In such a measurement unit 172, light reflected by the medium M is guided to the spectral device 172A by light receiving optical member 172C and light having a predetermined wavelength spectrally separated by the spectral device 172A is received by the light receiving unit 172B.

The light receiving optical member 172C is provided with a single or a plurality of optical members. As the optical member, for example, a single or a plurality of apertures can be exemplified. The measurement light reflected on a predetermined measurement region on the medium M can be guided to the spectral device 172A and the light receiving unit 172B by providing such an aperture. As the optical member configuring light receiving optical member 172C, for example, a lens such as a condensing lens may be provided or a bandpass filter may be provided. In a case where the bandpass filter is provided, it is possible to cut light (for example, light other than visible light) other than a desired measurement wavelength range.

Configuration of Spectral Device

Figure 3:
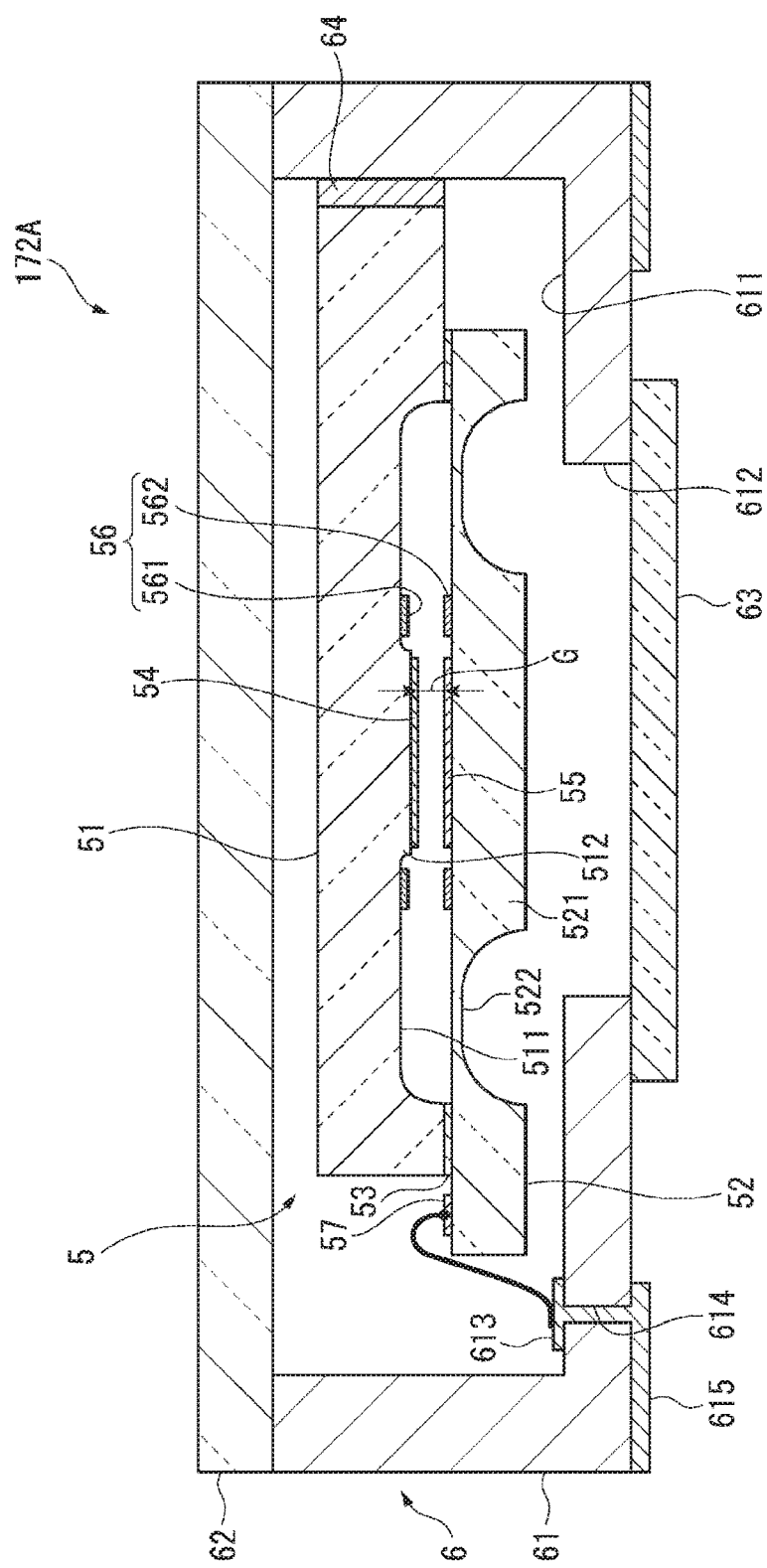
FIG. 3 is a cross-sectional view illustrating a schematic configuration of a spectral device of the first embodiment.

FIG. 3 is a cross-sectional view illustrating a schematic configuration of the spectral device 172A.

The spectral device 172A is provided with a housing 6, and a variable wavelength interference filter 5 (spectral element) housed inside the housing 6.

Configuration of Variable Wavelength Interference Filter

The variable wavelength interference filter 5 is a variable wavelength-type Fabry-Perot etalon element, and forms the spectral element in the invention. Although an example is illustrated in the embodiment in which the variable wavelength interference filter 5 is disposed in the spectrometer 17 in a state where accommodated in the housing 6, a configuration may be used where the variable wavelength interference filter 5 is directly disposed in the spectrometer 17.

The variable wavelength interference filter 5 is provided with a fixed substrate 51 and a movable substrate 52 that has transmissivity to visible light, as illustrated in FIG. 3, and the fixed substrate 51 and movable substrate 52 are integrally formed by being bonded with a bonding film 53. A first groove portion 511 and a second groove portion 512 with a shallower groove depth than the first groove portion 511 are provided on the fixed substrate 51, and a fixed electrode 561 and a fixed reflection film 54 are provided on the first groove portion 511 and the second groove portion 512, respectively. The fixed reflection film 54 is formed by a metal film such as Ag, an alloy film, such as an Ag alloy, a dielectric multilayer film in which a high refraction film and a low refraction film are stacked or a stacked body in which the metal film (alloy film) and the dielectric multilayer film are stacked.

The movable substrate 52 is provided with a movable portion 521, and a holding portion 522 that is provided outside the movable portion 521 and that holds the movable portion 521. A movable electrode 562 that faces the fixed electrode 561 and a movable reflection film 55 that faces the fixed reflection film 54 are provided on a surface of the movable portion 521 that faces the fixed substrate 51. A reflection film with the same configuration as the above-described fixed reflection film 54 can be used as the movable reflection film 55. The holding portion 522 is a diaphragm that surrounds the periphery of the movable portion 521, and is formed with a thickness dimensions smaller than that of the movable portion 521.

In the variable wavelength interference filter 5 described above, gap dimensions of a gap G between the fixed reflection film 54 and the movable reflection film 55 can be changed by forming an electrostatic actuator 56 by the fixed electrode 561 and the movable electrode 562 and applying a voltage to the electrostatic actuator 56. A plurality of electrode pads 57 that are individually connected to the fixed electrode 561 or the movable electrode 562 are provided on the outer peripheral portion (region not facing the fixed substrate 51) of the movable substrate 52.

Configuration of Housing

The housing 6 is provided with a base 61 and a glass substrate 62, as illustrated in FIG. 3. The base 61 and the glass substrate 62 are formed with an accommodation space in the interior by being bonded, for example, by means of a low melting point glass bonding or the like, and the variable wavelength interference filter 5 is accommodated in the accommodation space.

The base 61 is formed, for example, by stacking thin plate-like ceramics, and includes a recessed portion 611 capable of accommodating the variable wavelength interference filter 5. The variable wavelength interference filter 5 is fixed, for example, to a side surface of the recessed portion 611 of the base 61 by a fixing material 64. A light through hole 612 is provided in a bottom surface of the recessed portion 611 of the base 61, and a cover glass 63 that covers the light through hole 612 is bonded thereto.

An inside terminal portion 613 that is connected to the electrode pad 57 of the variable wavelength interference filter 5 is provided on the base 61 and the inside terminal portion 613 is connected to an outside terminal portion 615 provided on the outside of the base 61 via a conducting hole 614. The outside terminal portion 615 is electrically connected to the control unit 15.

Configuration of Light Receiving Unit

Returning to FIG. 2, the light receiving unit 172B is disposed on the optical axis (on the straight line that passes through the center points of the reflection films 54 and 55) of the variable wavelength interference filter 5, receives light passing through the variable wavelength interference filter 5 in the light receiving region, and outputs a detection signal (current value) in response to the received light quantity. The detection signal output by the light receiving unit 172B is input to the control unit 15 via the I-V converter (not shown), amplifier (not shown), and the AD converter (not shown).

Configuration of Control Unit

Next, the control unit 15 will be described.

The control unit 15 is formed including an I/F 151, a unit control circuit 152, a memory 153, and a central processing unit (CPU) 154, as illustrated in FIG. 2.

The I/F 151 inputs printing data input from the external device 20 to the CPU 154.

The unit control circuit 152 is provided with a control circuit that controls each of the supply unit 11, the transport unit 12, the printing unit 16, the light sources 171A1 and 171B1, the variable wavelength interference filter 5, the light receiving unit 172B, and the carriage movement unit 14, and controls the operation of each unit based on an instruction signal from the CPU 154. It should be noted that the control circuits of each unit are provided separately to the control unit 15 and may be connected to the control unit 15.

The memory 153 stores various programs and a variety of data that control the operation of the printer 10.

Examples of the variety of data include V-λ data that indicates a wavelength of light that passes through the variable wavelength interference filter 5 with respect to the voltage applied to the electrostatic actuator 56 when controlling the variable wavelength interference filter 5, and printing profile data that stores the discharge amount of each ink with respect to the color data included in the print data. The light emitting characteristics with respect to each wavelength of the light sources 171A1 and 171B1, the light reception characteristics with respect to each wavelength of the light receiving unit 172B (light receiving sensitivity characteristics), and the like may be stored.

Figure 4:
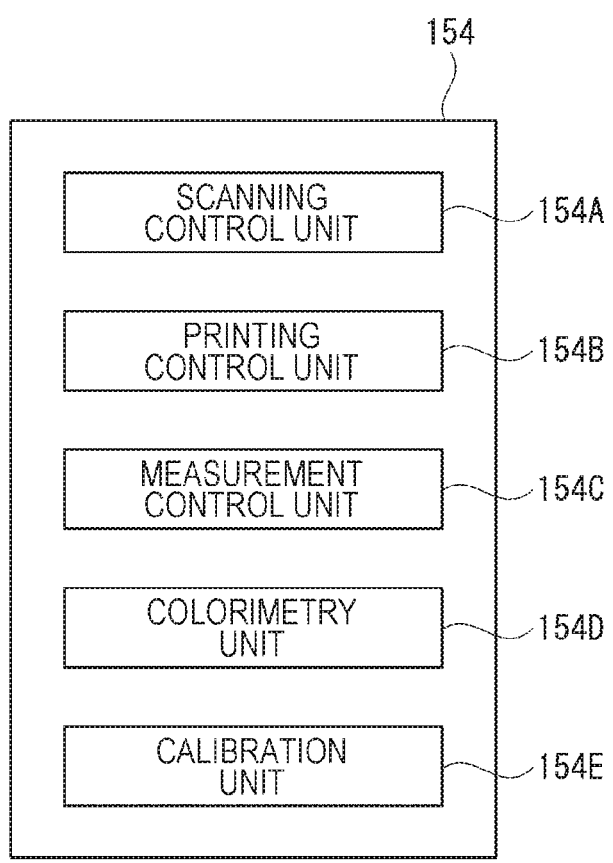
FIG. 4 is a block diagram illustrating a functional configuration of a CPU included in a control unit of the printer of the first embodiment.

FIG. 4 is a block diagram illustrating a functional configuration of the CPU 154 included in the control unit 15 of the printer 10.

The CPU 154 functions as a scanning control unit 154A, a printing control unit 154B, a measurement control unit 154C, a colorimetry unit 154D, a calibration unit 154E, and the like, as illustrated in FIG. 4, by reading out and executing various programs stored in the memory 153.

The scanning control unit 154A outputs an instruction signal indicating the supply unit 11, the transport unit 12, and the carriage movement unit 14 being driven to the unit control circuit 152. Accordingly, the unit control circuit 152 causes the roll driving motor of the supply unit 11 to be driven and the medium M to be supplied to the transport unit 12. The unit control circuit 152 causes the transport motor of the transport unit 12 to be driven and transports a predetermined region of the medium M along the Y direction as far as the position facing the carriage 13 of the platen 122. The unit control circuit 152 causes the carriage motor 142 of the carriage movement unit 14 to be driven and the carriage 13 to be moved along the X direction.

The printing control unit 154B outputs the instruction signal indicating the control of the printing unit 16 to the unit control circuit 152 based on the printing data input from an external device 20. When the instruction signal is input from the printing control unit 154B to the unit control circuit 152, the unit control circuit 152 outputs the printing control signal to the printing unit 16, and causes ink to be discharged to the medium M by a piezoelectric element provided in the nozzle being driven. When carrying out printing, the carriage 13 is moved along the X direction, the dot forming operation that forms a dot by ink being discharged from the printing unit 16 during the movement and the transport operation that transports the medium M in the Y direction are alternately repeated, and an image formed from a plurality of dots is printed on the medium M.

The measurement control unit 154C carries out the spectral measurement processing. Specifically, the measurement control unit 154C outputs the instruction signal for controlling the light sources 171A1 and 171B1 to the unit control circuit 152, and causes light to be radiated from the light sources 171A1 and 171B1.

The measurement control unit 154C reads out the driving voltage for the electrostatic actuator 56 with respect to the wavelength of light caused to pass through the variable wavelength interference filter 5 from the V-λ data of the memory 153 and outputs the instruction signal to the unit control circuit 152. Accordingly, the unit control circuit 152 applies the instructed driving voltage to the variable wavelength interference filter 5 and light with a predetermined transmission wavelength is passed through from the variable wavelength interference filter 5.

The measurement control unit 154C stores the wavelength in the memory 153 associated with the voltage (or the wavelength of light that passes through the variable wavelength interference filter 5 corresponding to the voltage) applied to the electrostatic actuator 56.

The colorimetry unit 154D measures the chromaticity with respect to the measurement region $A_D$ based on the received light quantity with respect to light with light of a plurality of wavelengths obtained by the spectral measurement processing.

The calibration unit 154E corrects (updates) the print profile data based on the colorimetry results by the colorimetry unit 154D.

Relationship Between Illumination Region and Measurement Region

Next, the relationship between the illumination region at which the medium M is illuminated and the measurement region of the medium M by the measurement unit 172 when measurement is carried out with respect to the medium M when the illumination light is radiated on the medium M by the light source unit 171 of the above-described spectrometer 17 will be described.

Figure 5:
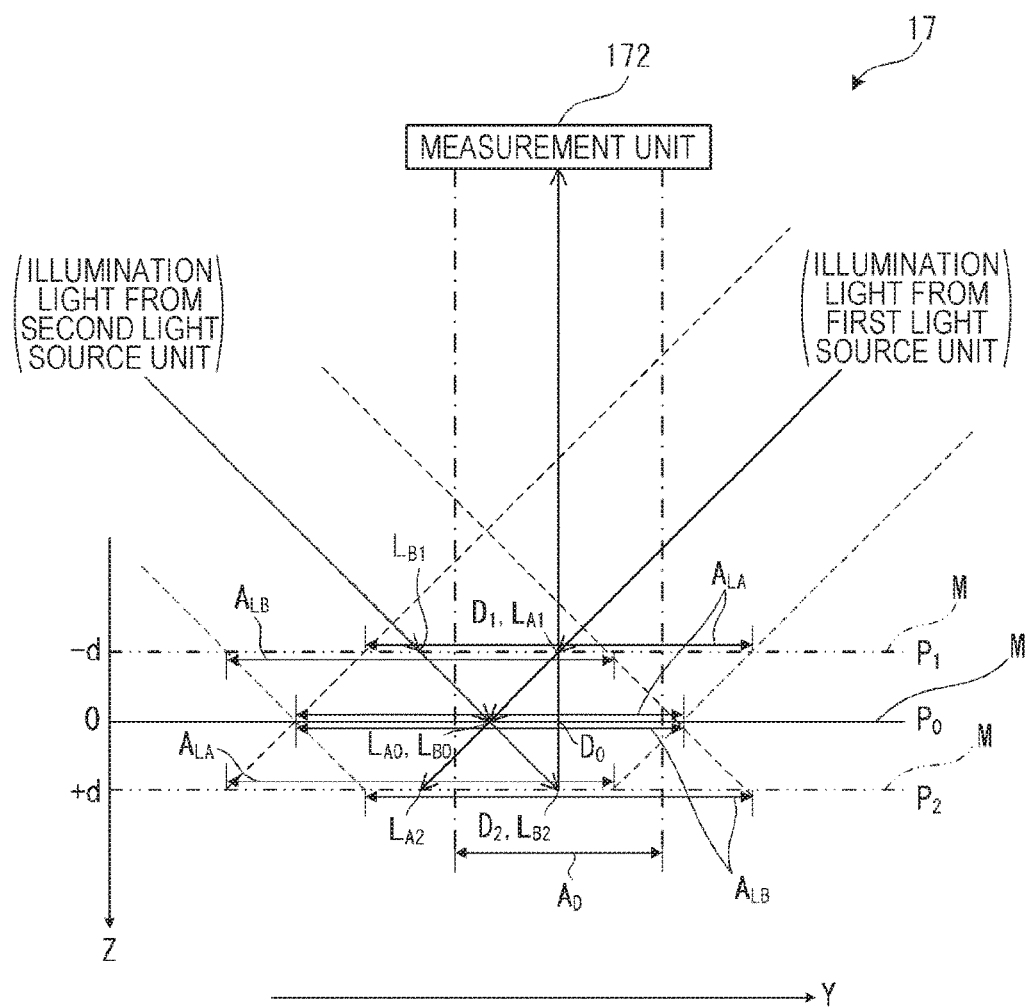
FIG. 5 is a drawing illustrating positions of an illumination region and a measurement region in an YZ plane in a case where a distance between media and a spectrometer fluctuates in the first embodiment.
Figure 6:
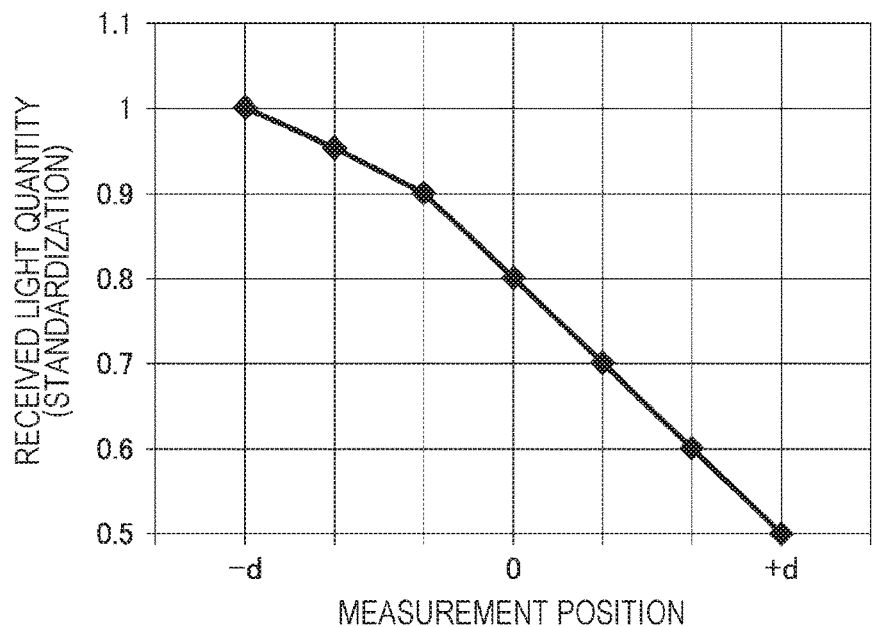
FIG. 6 is a drawing illustrating a received light quantity by a measurement unit in a case where the distance between the media and the spectrometer fluctuates in a case where only a first light source radiates an illumination light in the first embodiment.
Figure 7:
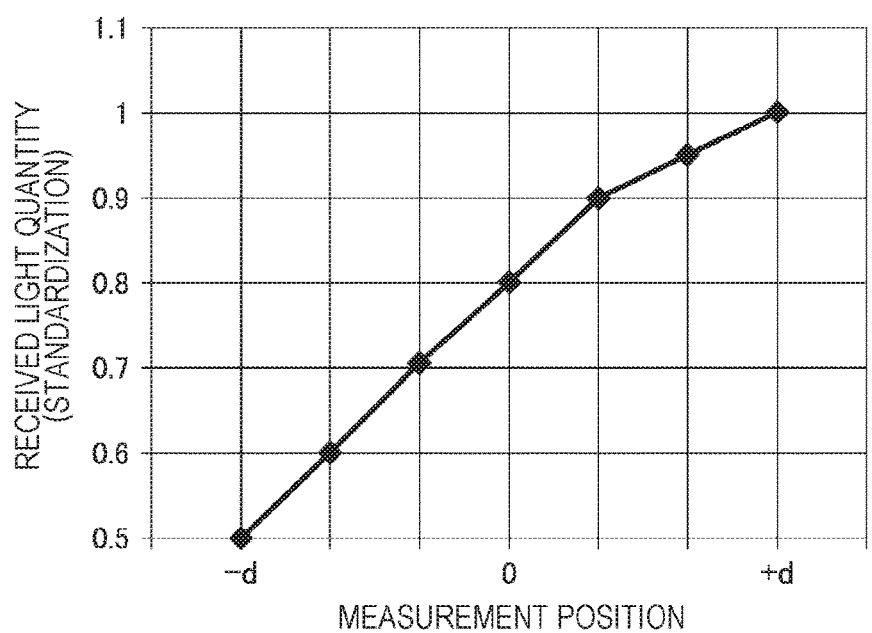
FIG. 7 is a drawing illustrating a received light quantity by the measurement unit in a case where the distance between the media and the spectrometer fluctuates in a case where only a second light source radiates the illumination light in the first embodiment.
Figure 8:
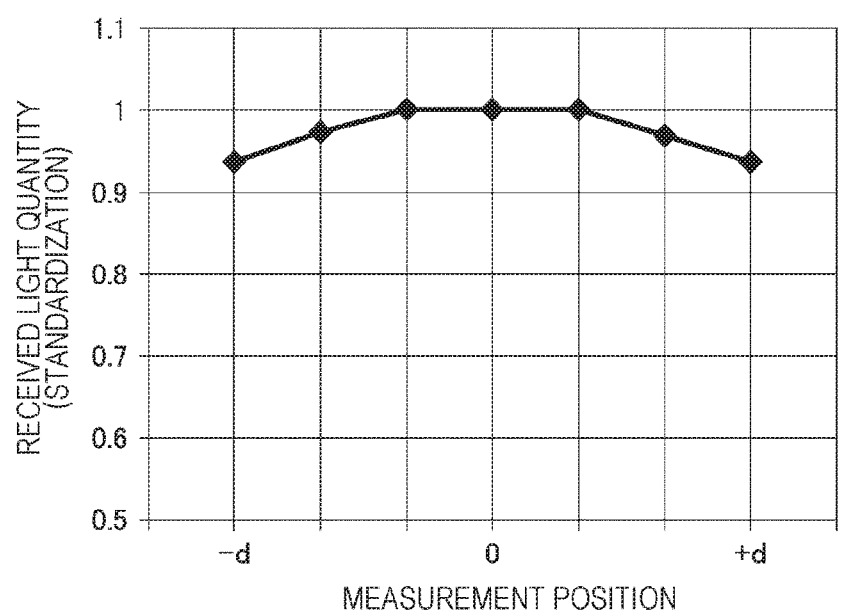
FIG. 8 is a drawing illustrating a received light quantity by the measurement unit in a case where the distance between the media and the spectrometer fluctuates in a case where the first light source and the second light source radiate the illumination light in the first embodiment.

FIG. 5 is a drawing illustrating positions of the illumination region and the measurement region in the YZ plane in a case where a distance between the media M and the spectrometer 17 fluctuates. FIG. 6 is a drawing illustrating the received light quantity by the measurement unit 172 in a case where the distance between the media M and the spectrometer 17 fluctuates in a case where only the first light source unit 171A radiates the illumination light. FIG. 7 is a drawing illustrating the received light quantity by the measurement unit 172 in a case where the distance between the media M and the spectrometer 17 fluctuates in a case where only the second light source unit 171B radiates the illumination light. FIG. 8 is a drawing illustrating the received light quantity by the measurement unit 172 in a case where the distance between the media M and the spectrometer 17 fluctuates in a case where the first light source unit 171A and the second light source unit 171B radiate the illumination light.

Here, a reference position $P_0$ is a relative position of the medium M with respect to the spectrometer 17 (measurement unit 172) in a case where there is no undulation or the like in the medium M and there is no displacement of the carriage 13 in the Z direction. In a case where the medium M is positioned at the reference position $P_0$, the distance between the medium M and the spectrometer 17 is a predetermined reference distance. In the embodiment, although the reference distance is the distance between the medium M and the spectrometer 17 when the medium M is positioned at the reference position $P_0$, the reference distance may be the distance between the medium M and the measurement unit 172. In FIGS. 6 to 8, the measurement position indicated on a horizontal axis is a distance fluctuation amount between the medium M and the spectrometer 17 and "0" indicates a state where the medium M is positioned at the reference position $P_0$ with respect to the spectrometer 17.

When performing the colorimetry processing (spectral measurement processing) with respect to the medium M, there are cases where the distance between the surface of the medium M and the spectrometer 17 fluctuates, for example, due to cockling or the like. Although the carriage 13 can move along the X direction by means of the carriage guide shaft 141, there is a case where a portion of the carriage guide shaft 141 is distorted, and the carriage 13 is displaced to the platen 122 side, or a case where the carriage 13 is displaced in the Z direction due to vibrations when the carriage 13 moves. Also in this case, the distance between the medium M and the spectrometer 17 fluctuates. It should be noted that, generally, an acceptable value (acceptable fluctuation amount d) of the distance between the medium M and the spectrometer 17 is set in advance during the measurement with the spectrometer 17, it is difficult to carry out accurate colorimetry when the distance fluctuates from the reference position $P_0$ in excess of the acceptable fluctuation amount d, and an error is output. Here, a position in a case where the distance between the medium M and the spectrometer 17 becomes smaller than the reference position $P_0$ by the acceptable fluctuation amount d is a first position $P_1$, and a position in a case where the distance between the medium M and the spectrometer is greater than the reference position $P_0$ by the acceptable fluctuation amount d is a second position $P_2$.

In the following description, a point at which the optical axis of the first light source unit 171A and the medium M intersect is expressed as a first illumination center $L_A$, particularly, in a case where the medium M is positioned at the reference position $P_0$, the first illumination center $L_A$ is expressed as $L_{A0}$, in a case where the medium M is positioned at the first position $P_1$, the first illumination center $L_A$ is expressed as $L_{A1}$, and in a case where the medium M is positioned at the second position $P_2$, the first illumination center $L_A$ is expressed as $L_{A2}$.

Furthermore, a point at which the optical axis of the second light source unit 171B and the medium M intersect is expressed as a second illumination center $L_B$, particularly, in a case where the medium M is positioned at the reference position $P_0$, the second illumination center $L_B$ is expressed as $L_{BC}$, in a case where the medium M is positioned at the first position $P_1$, the second illumination center $L_B$ is expressed as $L_{B1}$, and in a case where the medium M is positioned at the second position $P_2$, the second illumination center $L_B$ is expressed as $L_{B2}$.

In the embodiment, since the measurement unit 172 receives light reflected in the normal direction of the medium M, the measurement region $A_D$ in the medium M does not fluctuate regardless of the position of the medium M. Here, in the following description, the center of the measurement region $A_D$ of the measurement unit 172 is expressed as a measurement center D, particularly, in a case where the medium M is positioned at the reference position $P_0$, the measurement center D is expressed as $D_0$, in a case where the medium M is positioned at the first position $P_1$, the measurement center D is expressed as $D_1$, and in a case where the medium M is positioned at the second position $P_2$, the measurement center D is expressed as $D_2$.

Here, the optical axis of the first light source unit 171A and the optical axis of the second light source unit 171B are the optical axes when the medium is irradiated with the illumination light by each light source. For example, as illustrated in FIG. 2, in a case where the optical path is changed by inserting the mirror or the like between the light source 171A1 (or the light source 171B1) and the medium M, instead of the optical axis between the light source 171A1 (or the light source 171B1) and the mirror, the optical axis between the mirror and the medium M is the optical axis (optical axis of the first illumination light) of the first light source unit 171A and the optical axis (optical axis of the second illumination light) of the second light source unit 171B.

Even if there is only one light source unit, the same is true in a case where two illumination lights are obtained by a beam splitter such as a half mirror. In this case, it may be understood that the optical axis of the first light source unit 171A is replaced by an optical axis of one illumination light obtained by the beam splitter, and the optical axis of the second light source unit 171B is replaced by an optical axis of the other illumination light obtained by the beam splitter.

Furthermore, a range in which a light quantity value is a predetermined value or more is expressed as a first illumination region $A_{LA}$ around the first illumination center $L_A$, and a range in which the light quantity value is the predetermined value or more is expressed as a second illumination region $A_{LB}$ around the second illumination center $L_B$. The first illumination region $A_{LA}$ and the second illumination region $A_{LB}$ are regions in which a light quantity distribution hardly occurs and are regions in which an influence of the light quantity distribution on the measurement does not become a problem when the measurement is carried out by a single light source. That is, when the measurement is carried out using only the first light source unit 171A and the first illumination center $L_A$ is matched to the measurement center D, a range around the first illumination center $L_A$, at which the measurement with high precision can be carried out, is the first illumination region $A_{LA}$. When the measurement is carried out using only the second light source unit 171B and the second illumination center $L_B$ is matched to the measurement center D, a range around the second illumination center $L_B$, at which the measurement with high precision can be carried out, is the second illumination region $A_{LB}$.

In a case where the colorimetry is carried out according to the format (45/0° colorimetry system) of the optical geometric conditions stipulated by the colorimetry standards (JIS Z 8722), if the distance between the medium M and the spectrometer 17 fluctuates, the position of the illumination region is displaced. In the embodiment, since the first light source unit 171A and the second light source unit 171B are disposed along the Y direction, the first illumination center $L_A$ and the second illumination center $L_B$ move along the Y direction, and the first illumination region $A_{LA}$ and the second illumination region $A_{LB}$ also move along the Y direction due to the fluctuation of the distance between the medium M and the spectrometer 17.

Specifically, when the distance between the medium M and the spectrometer 17 decreases by $\Delta d$, the first illumination center $L_A$ moves on the +Y side by $\Delta d$ and the second illumination center $L_B$ moves on the −Y side by $\Delta d$. When the distance between the medium M and the spectrometer 17 increases by $\Delta d$, the first illumination center $L_A$ moves on the −Y side by $\Delta d$ and the second illumination center $L_B$ moves on the +Y side by $\Delta d$.

Therefore, in the embodiment, as illustrated in FIG. 5, in a case where the medium M is positioned at the first position $P_1$, the first light source unit 171A radiates the illumination light so that the first illumination center $L_{A1}$ and the measurement center $D_1$ match. That is, the first illumination region $A_{LA}$ moves on the −Y side from the measurement region $A_D$ as the medium M moves from the first position $P_1$ to the second position $P_2$. Therefore, as illustrated in FIG. 6, in a case where only the first light source unit 171A is used and in a case where the medium M is positioned at the second position $P_2$ (in a case where, the measurement position is "+d"), the received light quantity by the measurement unit 172 becomes the minimum. As the distance between the medium M and the spectrometer 17 decreases, the received light quantity by the measurement unit 172 increases and when the medium M is positioned at the first position $P_1$ (in a case where, the measurement position is "−d"), the received light quantity by the measurement unit 172 becomes the maximum.

On the other hand, as illustrated in FIG. 5, in a case where the medium M is positioned at the second position $P_2$, the second light source unit 171B radiates the illumination light so that the second illumination center $L_{B2}$ and the measurement center $D_2$ match. That is, the second illumination region $A_{LB}$ moves on the +Y side from the measurement region $A_D$ as the medium M moves from the second position $P_2$ to the first position $P_1$. Therefore, as illustrated in FIG. 7, in a case where only the second light source unit 171B is used and in a case where the medium M is positioned at the first position $P_1$, the received light quantity by the measurement unit 172 becomes the minimum. As the distance between the medium M and the spectrometer 17 increases, the received light quantity by the measurement unit 172 increases and when the medium M is positioned at the second position $P_2$, the received light quantity by the measurement unit 172 becomes the maximum.

The measurement region $A_D$ is a region in which the distance from the measurement center D is greater than the acceptable fluctuation amount d and is included in the first illumination region $A_{LA}$ and the second illumination region $A_{LB}$ when the medium M is positioned at the reference position $P_0$.

Therefore, in a case where the medium M is positioned at the reference position $P_0$, the first illumination center $L_{A0}$ and the second illumination center $L_{B0}$ are positioned on the −Y side by a distance d from the measurement center $D_0$, and the optical axis of the illumination light from the first light source unit 171A and the optical axis of the illumination light from the second light source unit 171B intersect at the position.

That is, when a position at which the medium M is positioned at the reference position $P_0$ is Z=0, the optical axis of the first light source unit 171A and the optical axis of the second light source unit 171B intersect at an intersection point in coordinates (y,z)=(−d,0) in the YZ plane, and the intersection point is included in the measurement region $A_D$ when the medium M is viewed from the Z direction.

In such a configuration, even in a case where the distance between the medium M and the spectrometer 17 fluctuates, any one of the first illumination center $L_A$ and the second illumination center $L_B$ is included in the measurement region $A_D$ and even if any one of the first illumination center $L_A$ and the second illumination center $L_B$ is separated from the measurement center D, the other approaches the measurement center D. Therefore, the light quantity within the measurement region $A_D$ does not significantly decrease and as illustrated in FIG. 8, the measurement region $A_D$ is capable of being irradiated with the illumination light of a substantially uniform light quantity and lowering of the measurement precision can be suppressed regardless of the distance between the medium M and the spectrometer 17.

Spectral Measurement Method

Next, a spectral measurement method in the printer 10 of the embodiment will be described with reference to the drawings.

Figure 9:
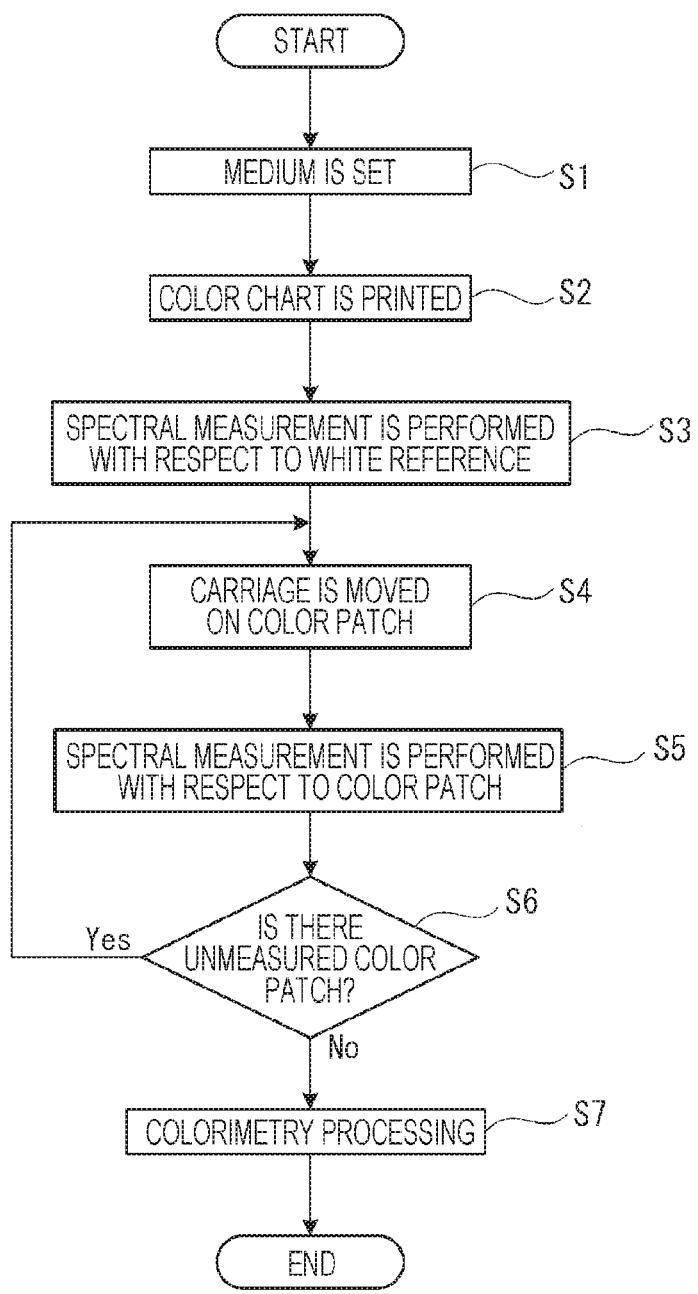
FIG. 9 is a flowchart illustrating a spectral measurement method in a printer in the first embodiment.
Figure 10:
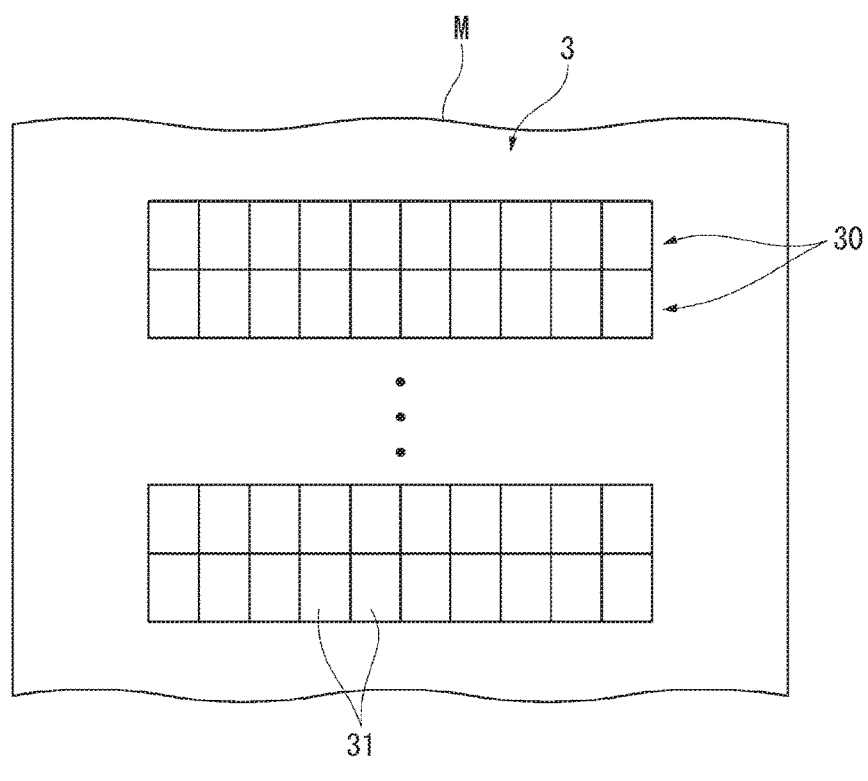
FIG. 10 is a drawing illustrating an example of a color chart formed in the first embodiment.

FIG. 9 is a flowchart illustrating the spectral measurement method in the printer 10. FIG. 10 is a drawing illustrating an example of a color chart formed in the embodiment.

Formation of Color Chart

In the spectral measurement method by the printer 10, first, the color chart including a color patch 31 is formed on the medium M.

The scanning control unit 154A sets the medium M at a predetermined position (step S1). That is, the scanning control unit 154A controls the supply unit 11 and the transport unit 12, transports the medium M in a sub-scanning direction (+Y direction), and sets a predetermined printing start position of the medium M on the platen 122. The scanning control unit 154A moves the carriage 13 to an initial position (for example, an end portion on a −X side in the main scanning direction).

Thereafter, the printing control unit 154B reads the printing data for calibration from the memory 153 and prints the color chart on the medium M in synchronization with control by the scanning control unit 154A (step S2).

That is, the scanning control unit 154A causes the carriage 13 to scan on a +X side, for example, at a constant speed. The printing control unit 154B specifies the position of the printing unit 16 of the carriage 13 according to, for example, a time from scanning start and ink is discharged from nozzles of a predetermined color at a predetermined position based on the printing data for calibration thereby forming dots (dot forming operation). When the carriage 13 is moved to the end portion in the +X side, the scanning control unit 154A controls the supply unit 11 and the transport unit 12, and transports the medium M in the +Y direction (transporting operation). Therefore, the scanning control unit 154A causes the carriage 13 to scan in the −X direction and the printing control unit 154B forms dots at predetermined positions based on the printing data for calibration.

The color chart 3 is formed on the medium M as illustrated in FIG. 10 by repeating the dot forming operation and the transporting operation as described above. Specifically, a plurality of color patch groups 30, which are configured by disposing the color patches 31 of a plurality of colors along the X direction without gaps, are disposed along the Y direction thereby forming a color chart 3.

After step S2, when ink of the printed color chart is dried, the control unit 15 carries out the spectral measurement processing with respect to a white reference (step S3). The white reference may be a region in which an image is not printed in the medium M or may be a white reference object (not shown) provided in the platen 122.

In the spectral measurement processing, the measurement control unit 154C sequentially switches a drive voltage to the electrostatic actuator 56 of the variable wavelength interference filter 5 based on the V-λ data stored in the memory 153, and measures a measurement value (light quantity) with respect to a measurement wavelength of 16 bands with 20 nm spacing, for example, in a visible light region of 400 nm to 700 nm.

Next, the scanning control unit 154A controls the transport unit 12 and the carriage movement unit 14, and moves the carriage 13 so that the measurement region $A_D$ is positioned on the color patch 31 (step S4).

The measurement control unit 154C carries out the same processing as that of step S5, the spectral measurement processing is carried out with respect to the color patch, and the measurement value is obtained with respect to each wavelength (step S5).

In this case, in the embodiment, even in a case where the distance between the medium M and the spectrometer 17 fluctuates, if the fluctuation amount is within the acceptable fluctuation amount d, as described above, it is possible to sufficiently irradiate the measurement region $A_D$ with the illumination light of a sufficient light quantity and to perform the measurement with high precision.

In the embodiment, the first light source unit 171A and the second light source unit 171B are disposed along the Y direction with the measurement unit 172 interposed therebetween. In such a configuration, in a case where the distance between the medium M and the spectrometer 17 fluctuates, the first illumination region $A_{LA}$ or the second illumination region $A_{LB}$ moves in the Y direction. Therefore, it is possible to suppress the movement of the first illumination region $A_{LA}$ or the second illumination region $A_{LB}$ onto the other color patch 31 adjacent to the color patch 31 that is the measurement target in the X direction. That is, light reflected by the other color patch 31 is not incident on the measurement unit 172 and lowering of the measurement precision is suppressed.

Thereafter, the measurement control unit 154C determines whether or not there is an unmeasured color patch (step S6).

In step S6, if "Yes" is determined, the procedure returns to step S4, the scanning control unit 154A controls the transport unit 12 or the carriage movement unit 14, moves the measurement region $A_D$ of the measurement unit 172 to the next color patch 31, and carries out the spectral measurement processing with respect to the color patch 31.

In step S6, if "No" is determined, the control unit 15 carries out the colorimetry processing (step S7). Specifically, the colorimetry unit 154D calculates a reflectivity with respect to each measurement wavelength based on the measurement value and a reference measurement value with respect to each measurement wavelength, calculates a colorimetry value (for example, a XYZ value, an Lab value, or the like) based on the calculated reflectivity, and stores the colorimetry value in the memory 153. The calibration unit 154E updates print profile data stored in the memory 153 based on a colorimetry result of each color patch.

Actions and Effects of Embodiment

The printer 10 of the embodiment has the spectrometer 17 mounted on the carriage 13 and the spectrometer 17 includes the light source unit 171 having the first light source unit 171A and second light source unit 171B that radiate the illumination light on the medium M, and the measurement unit 172 that measures the reflection light (measurement light) reflected on the measurement object. Therefore, in a case where the medium M is positioned at the reference position $P_0$, the first illumination center $L_{A0}$ and the second illumination center $L_{B0}$, and the measurement center $D_0$ are shifted and exist at different positions.

In such a configuration, in a case where cockling or the like occurs in the medium M and a relative distance between the medium M and the spectrometer 17 fluctuates, at least one of the first illumination center $L_{A0}$ and the second illumination center $L_{B0}$ approaches the measurement center D and it is possible to suppress reduction of the light quantity of the illumination light applied to the measurement region $A_D$. At the reference position $P_0$, although the first illumination center $L_{A0}$ and the second illumination center $L_{B0}$, and the measurement center $D_0$ are shifted, the measurement region $A_D$ is irradiated with the illumination light by both the first illumination region $A_{LA}$ and the second illumination region $A_{LB}$. Therefore, the measurement region $A_D$ is irradiated with a sufficient light quantity and it is possible to obtain sufficient measurement precision. Therefore, in the embodiment, even in a case where the medium M is displaced due to cockling or the like in the Z direction, or the carriage 13 is displaced due to vibration or the like in the Z direction, even if the distance between the medium M and the spectrometer 17 fluctuates, it is possible to suppress reduction of the light quantity applied to the measurement region $A_D$ and to carry out the spectral measurement with high precision.

In the embodiment, the optical axis of the first light source unit 171A and the optical axis of the second light source unit 171B intersect at the intersection point of coordinates (y,z)=(−d,0), and the intersection point is included in the measurement region $A_D$ when viewed from the normal direction of the medium M.

In such a configuration, the measurement region $A_D$ is irradiated with the illumination light from directions different from each other. Therefore, even in a case where the distance between the medium M and the spectrometer 17 fluctuates, any one of the first illumination center $L_A$ and measurement region $A_D$, and even if any one of the first illumination center $L_A$ and the second illumination center $L_B$ is separated from the measurement center D, the other approaches the measurement center D. Therefore, the light quantity within the measurement region $A_D$ does not significantly decrease, the measurement region $A_D$ is capable of being irradiated with the illumination light of a substantially uniform light quantity, and it is possible to realize the measurement with high precision.

In the embodiment, in a case where the medium M is positioned at the reference position $P_0$, the first illumination center $L_{A0}$ and the second illumination center $L_{B0}$ are shifted and positioned on the −Y side of the measurement center $D_0$. According to such a configuration, in a case where the distance between the medium M and the spectrometer 17 decreases, the first illumination center $L_A$ approaches the measurement center D and in a case where the distance between the medium M and the spectrometer 17 increases, the second illumination center $L_B$ approaches the measurement center D. Therefore, even in a case where the distance between the medium M and the spectrometer 17 decreases or increases, fluctuation of a total light quantity of the illumination light applied to the measurement region $A_D$ is suppressed. Therefore, it is possible to carry out the measurement with high precision in which lowering of the measurement precision is suppressed.

In the embodiment, at the first position $P_1$ at which the distance between the medium M and the spectrometer is smaller than the reference position $P_0$ by the acceptable fluctuation amount d, the first illumination center $L_{A1}$ and the measurement center $D_1$ match. In this case, in a case where the medium M is displaced on the spectrometer 17 side by the acceptable fluctuation amount d, the second illumination region $A_{LB}$ is shifted to a position (−Y side) most distant from the measurement region $A_D$. Therefore, the light quantity of the illumination light is minimized by the second light source unit 171B. However, the first illumination center $L_{A1}$ is matched to the measurement center $D_1$ so that the light quantity of the illumination light is maximized by the first light source unit 171A and it is possible to carry out the measurement with high precision by the illumination light of the first light source unit 171A.

In the embodiment, at the second position $P_2$ at which the distance between the medium M and the spectrometer is greater than the reference position $P_0$ by the acceptable fluctuation amount d, the second illumination center $L_{B2}$ and the measurement center $D_2$ match. In this case, in a case where the medium M is displaced on a side opposite to the spectrometer 17 by the acceptable fluctuation amount d, the first illumination region $A_{LA}$ is shifted to a position (−Y side) most distant from the measurement region $A_D$. Therefore, the light quantity of the illumination light by the first light source unit 171A is minimized. However, the second illumination center $L_{B2}$ is matched to the measurement center $D_2$ so that the light quantity of the illumination light by the second light source unit 171B is maximized and it is possible to carry out the measurement with high precision by the illumination light of the second light source unit 171B.

In the embodiment, the spectrometer 17 is mounted on the carriage 13 and is movable along the X direction by the carriage movement unit 14. Therefore, the first light source unit 171A and the second light source unit 171B are disposed along the Y direction intersecting (in the embodiment, orthogonal) to the X direction.

As in the embodiment, in a case where the spectrometer 17 is mounted on the printer 10, the plurality of color patches disposed along the X direction by the printing unit 16 of the printer 10 are measured by the spectrometer 17, and the print profile is corrected (updated) based on the measurement result (colorimetry result). In the measurement with respect to such a color patch, it is necessary to perform the measurement with high precision with respect to the color patches one by one.

Here, if the first light source unit 171A and the second light source unit 171B are disposed along the X direction, in a case where the distance between the medium M and the spectrometer 17 fluctuates, the first illumination region $A_{LA}$ and the second illumination region $A_{LB}$ are shifted along the X direction. In this case, the first illumination region $A_{LA}$ or the second illumination region $A_{LB}$ moves to the other color patch adjacent to the color patch that is the measurement target, and light reflected by the color patch can be incident on the measurement unit 172. In this case, an accurate colorimetry result is not obtained with respect to the measurement target. In contrast, in the embodiment, in a case where the distance between the medium M and the spectrometer 17 fluctuates, the positions of the first illumination region $A_{LA}$ and the second illumination region $A_{LB}$ are shifted along the Y direction by the configuration described above. Therefore, it is possible to suppress inconveniences that the reflection light from the other color patch adjacent to the color patch that is the measurement target in the X direction is incident on the measurement unit 172, and it is possible to carry out the measurement with high precision with respect to the color patch that is the measurement target.

It is also conceivable to increase the width dimension of the color patch in the X direction so that the reflection light from the adjacent color patch is not incident on the measurement unit 172. However, in this case, the number of the color patches capable of being disposed along the X direction is reduced. Usually, although a plurality of color patch groups in which the plurality of color patches are disposed along the X direction are disposed along the Y direction, if the number of the color patches included in the color patch group is small, it is necessary to dispose more color patch groups along the Y direction, and the time required for the measurement becomes longer accordingly. In contrast, in the embodiment, it is not necessary to increase the width dimension of each color patch along the X direction by the configuration described above, it is possible to form the color patch group in which more color patches are disposed along the X direction, and the time required for the measurement can be shortened.

In the embodiment, the measurement unit 172 is provided with the spectral device 172A, and light divided by the spectral device 172A is received by the light receiving unit 172B. Therefore, it is possible to carry out the spectral measurement with respect to the measurement region $A_D$ of the medium M. Since the chromaticity and the like of the image formed on the medium M can be precisely calculated, it is possible to carry out calibration of the printing unit with high precision based on the spectral measurement results or the calculated chromaticity.

The variable wavelength interference filter 5 is used as the spectral device 172A. The variable wavelength interference filter 5 has a simple configuration in which a pair of reflection films 54 and 55 face one another, and low costs and size reductions are possible compared to a case of using another spectral element such as an AOTF or an LCTF, and it is possible to reduce the size of the measurement unit 172. Thus, the measurement unit 172 is easily mounted on the carriage 13, and it is also possible to suppress defects, such as the movement of the carriage 13 being impeded by a weight of the measurement unit 172.

Since the printing unit 16 and the spectrometer 17 can be mounted on the carriage 13, simplification of the configuration can be achieved compared to a case where a carriage for the printing unit 16 and a carriage for the spectrometer 17 are used. Both the printing unit 16 and the spectrometer 17 are mounted on the carriage 13 so that it is possible to immediately carry out the colorimetry with respect to the formed image using the spectrometer 17 after performing the image formation (printing) on the medium M by the printing unit 16. Immediately after being printed by the printing unit 16, cockling or the like may occur on the medium M due to ink which is not dried, but in the embodiment, as described above, it is possible to suppress lowering of the measurement precision due to such cockling.

In the embodiment, the spectrometer 17 is mounted on the printer 10 provided with a printing unit 16 that forms an image on the medium M, and carries out spectral measurement with respect to the medium M. The calibration unit 154E updates the printing profile data based on the reflectivity or chromaticity of each measurement wavelength calculated from the spectral measurement results.

In the printer 10, it is possible to carry out spectral measurement with high precision on a color patch as described above, and possible to perform a colorimetry processing with high precision. Accordingly, it is possible to form an image in which chromaticity desired by a user is reproduced with high precision by the printing unit 16 by updating the printing profile data based on the colorimetry results of the colorimetry processing.

Second Embodiment

Next, a second embodiment according to the invention will be described.

In the first embodiment described above, an example, in which the illumination light from the first light source unit 171A and the second light source unit 171B is incident on the medium M at an angle of 45° and the measurement light reflected in the normal direction of the medium M is received by the measurement unit 172, is illustrated.

In contrast, in the second embodiment, an example, in which a light source radiates an illumination light from the normal direction of the medium M and light reflected by 45° is measured by a measurement unit, is described.

Figure 11:
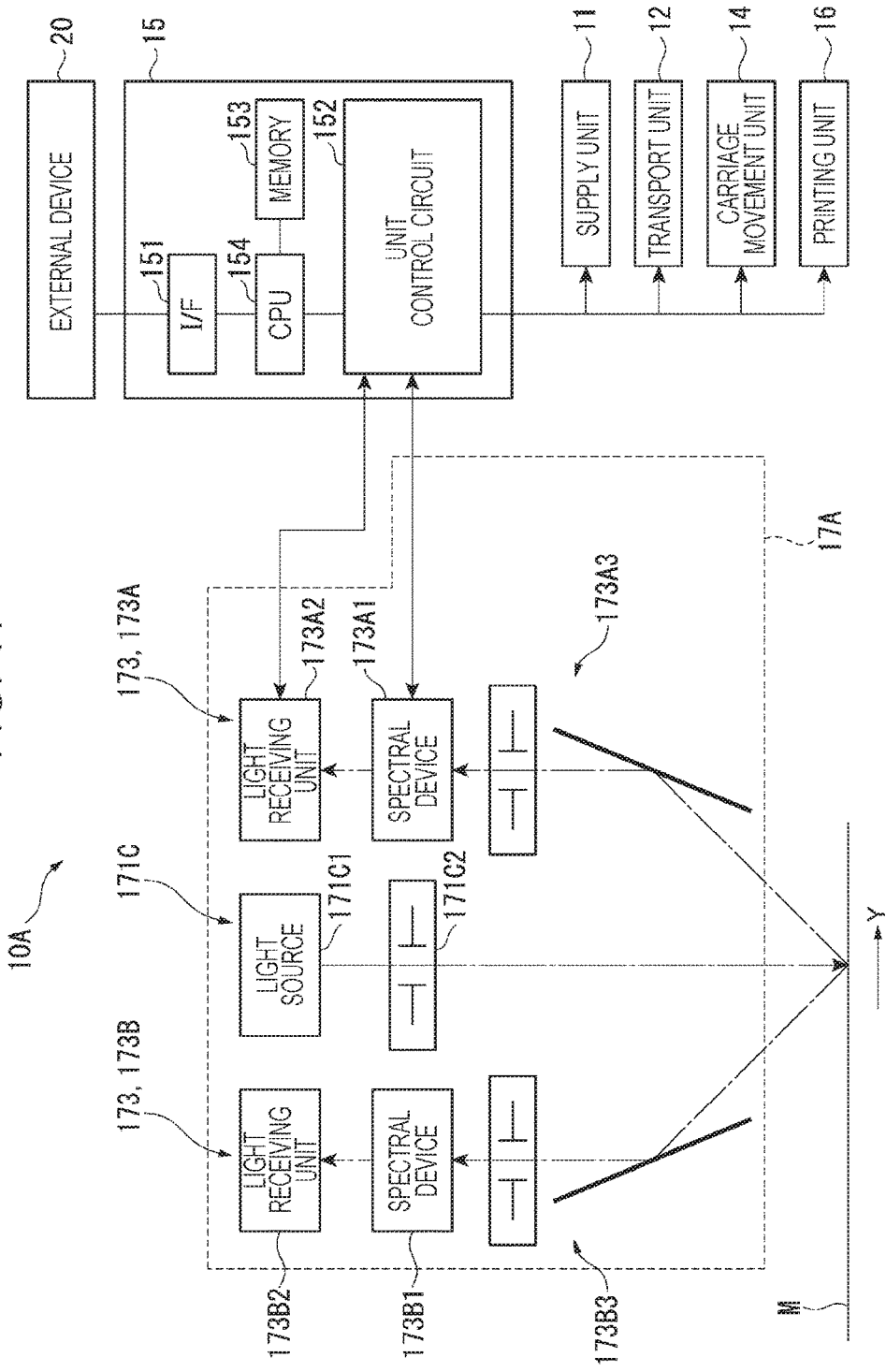
FIG. 11 is a block diagram illustrating a schematic configuration of a printer of a second embodiment.

FIG. 11 is a block diagram illustrating a schematic configuration of a printer 10A of the second embodiment. The same reference numerals are given to the configurations which are already described and the description thereof will be omitted or simplified.

Similar to the first embodiment, the printer 10A of the second embodiment includes a supply unit 11, a transport unit 12, a carriage 13, a carriage movement unit 14, and a control unit 15. The carriage 13 includes a printing unit 16 and a spectrometer 17A.

As illustrated in FIG. 11, the spectrometer 17A of the embodiment is configured including a light source unit 171C and a measurement unit 173.

The light source unit 171C of the embodiment includes one light source 171C1 and an illumination optical member 171C2 that is provided on an optical path of the illumination light from the light source 171C1. The light source 171C1 has the same configuration as that of the light source 171A1 or the light source 171B1 of the first embodiment. Similar to the illumination optical member 171A2 or the illumination optical member 171B2 of the first embodiment, the illumination optical member 171C2 is an optical member that guides the illumination light from the light source 171C1 on the medium M and is configured of, for example, an aperture or the like.

As illustrated in FIG. 11, the measurement unit 173 includes a first measurement unit 173A and a second measurement unit 173B. Specifically, the first measurement unit 173A is disposed on a +Y side of the light source unit 171C and the second measurement unit 173B is disposed on a −Y side of the light source unit 171C.

The first measurement unit 173A is configured of a spectral device 173A1, a light receiving unit 173A2, a light receiving optical member 173A3, and the like. The second measurement unit 173B is configured of a spectral device 173B1, a light receiving unit 173B2, a light receiving optical member 173B3, and the like.

The spectral devices 173A1 and 173B1 have the same configuration as that of the spectral device 172A in the first embodiment, and is configured including a variable wavelength interference filter 5.

The light receiving units 173A2 and 173B2 are similar to the light receiving unit 172B in the first embodiment, the light receiving unit 173A2 receives light of a predetermined wavelength separated by the spectral device 173A1, and the light receiving unit 173B2 receives light of a predetermined wavelength separated by the spectral device 173B1.

The light receiving optical members 173A3 and 173B3 are substantially similar to light receiving optical member 172C of the first embodiment and, for example, are configured of an aperture, a mirror, a reflecting mirror, or the like. Therefore, the light receiving optical member 173A3 guides the measurement light reflected on the medium M on the +Y side at an angle of 45° to the spectral device 173A1 and the light receiving unit 173A2. The light receiving optical member 173B3 guides the measurement light reflected on the medium M on the −Y side at an angle of 45° to the spectral device 173B1 and the light receiving unit 173B2.

Relationship Between Illumination Region and Measurement Region

Figure 12:
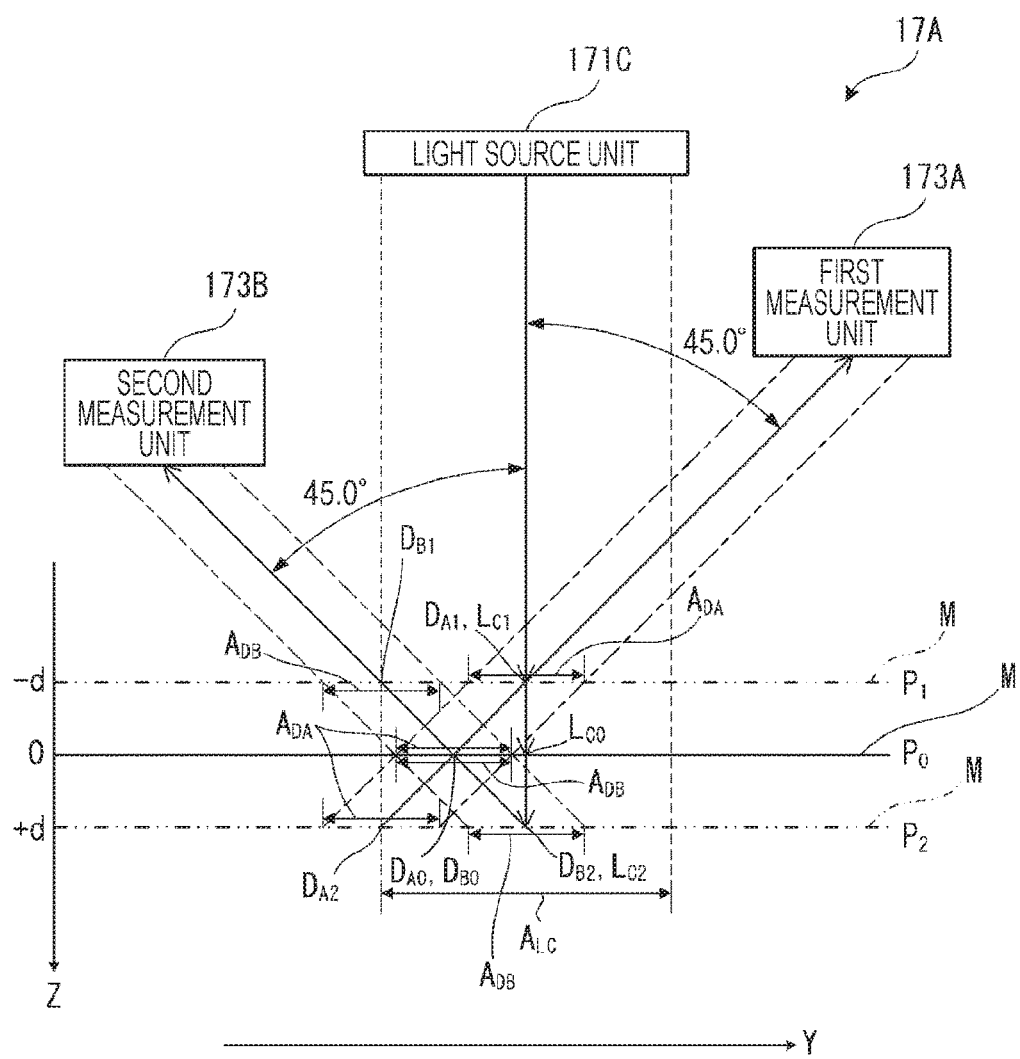
FIG. 12 is a drawing illustrating positions of an illumination region and a measurement region in an YZ plane in a case where a distance between media and a spectrometer fluctuates in the second embodiment.

FIG. 12 is a drawing illustrating positions of the illumination region and the measurement region in a YZ plane in a case where a distance between the media M and the spectrometer 17A fluctuates.

In the embodiment, the colorimetry is carried out according to the form (0/45° colorimetry system) of the optical geometric conditions stipulated by the colorimetry standards (JIS Z 8722), the medium M is irradiated with light from a normal direction, and the measurement light reflected at 45° is measured.

Therefore, in the embodiment, the illumination light from the light source unit 171C is applied a substantially fixed position regardless of a distance between the medium M and the spectrometer 17A. A point at which the optical axis of the light source unit 171C and the medium M intersect is expressed as an illumination center $L_C$, particularly, in a case where the medium M is positioned at the reference position $P_0$, the illumination center $L_C$ is expressed as $L_{C0}$, in a case where the medium M is positioned at the first position $P_1$, the illumination center $L_C$ is expressed as $L_{C1}$, and in a case where the medium M is positioned at the second position $P_2$, the illumination center $L_C$ is expressed as $L_{C2}$.

On the other hand, the measurement regions of the first measurement unit 173A and the second measurement unit 173B fluctuate along the Y direction according to the distance between the medium M and the spectrometer 17A. Here, a center of a measurement region $A_{DA}$ by the first measurement unit 173A is referred to as a first measurement center $D_A$ and a center of a measurement region $A_{DB}$ by the second measurement unit 173B is referred to as a second measurement center $D_B$. Particularly, in a case where the medium M is positioned at the reference position $P_0$, the first measurement center $D_A$ is expressed as $D_{A0}$, and the second measurement center $D_B$ is expressed as $D_{B0}$, in a case where the medium M is positioned at the first position $P_1$, the first measurement center $D_A$ is expressed as $D_{A1}$, and the second measurement center $D_B$ is expressed as $D_{B1}$, and in a case where the medium M is positioned at the second position $P_2$, the first measurement center $D_A$ is expressed as $D_{A2}$, and the second measurement center $D_B$ is expressed as $D_{B2}$.

In the 0/45° colorimetry system, when the distance between the medium M and the spectrometer 17A decreases by Δd, the first measurement center $D_A$ moves on the +Y side by Δd and the second measurement center $D_B$ moves on the −Y side by Δd. When the distance between the medium M and the spectrometer 17A increases by Δd, the first measurement center $D_A$ moves on the −Y side by Δd and the second measurement center $D_B$ moves on the +Y side by Δd.

Therefore, in the embodiment, as illustrated in FIG. 12, in a case where the medium M is positioned at the first position $P_1$, an arrangement position of the first measurement unit 173A is set or the light receiving optical member 173A3 is configured so that the first measurement center $D_{A1}$ and the illumination center $L_{C1}$ match. That is, in a case where the medium M is positioned at the first position $P_1$, the first measurement unit 173A measures the measurement light from the measurement region $A_{DA}$ around the illumination center $L_{C1}$ as the first measurement center $D_{A1}$.

On the other hand, in a case where the medium M is positioned at the second position $P_2$, an arrangement position of the second measurement unit 173B is set or the light receiving optical member 173B3 is configured so that the second measurement center $D_{B2}$ and the illumination center $L_{C2}$ match. That is, in a case where the medium M is positioned at the second position $P_2$, the second measurement unit 173B measures the measurement light from the measurement region $A_{DB}$ around the illumination center $L_{C2}$ as the second measurement center $D_{B2}$.

An illumination region $A_{LC}$ is a region having a dimension in which a distance from the illumination center $L_C$ is greater than the acceptable fluctuation amount d. When the medium M is positioned at the reference position $P_0$, the first measurement region $A_{DA}$ and the second measurement region $A_{DB}$ are included in the illumination region $A_{LC}$.

Therefore, in a case where the medium M is positioned at the reference position $P_0$, the first measurement center $D_{A0}$ and the second measurement center $D_{B0}$ are positioned on the −Y side by the distance d from the illumination center $L_{C0}$, and the optical axis of the first measurement unit 173A and the optical axis of the second measurement unit 173B intersect at the position.

That is, the optical axis of the first measurement unit 173A and the optical axis of the second measurement unit 173B intersect at the intersection point of coordinates (y,z) =(−d,0) in the YZ plane, and the intersection point is included in the illumination region $A_{LC}$ when the medium M is viewed from the Z direction.

In such a configuration, even in a case where the distance between the medium M and the spectrometer 17A fluctuates, any one of the first measurement region $A_{DA}$ and the second measurement region $A_{DB}$ is included in the illumination region $A_{LC}$, and even if any one of the first measurement center $D_A$ and the second measurement center $D_B$ is separated from the illumination center $L_C$, the other approaches the illumination center $L_C$. Therefore, one of the first measurement unit 173A and the second measurement unit 173B having a large received light quantity is selected or an average value of measurement results of the first measurement unit 173A and the second measurement unit 173B is used. Therefore, it is possible to carry out measurement with respect to a region irradiated with the illumination light of a sufficient light quantity regardless of the distance between the medium M and the spectrometer 17A and to carry out the measurement with high precision.

Third Embodiment

Next, a third embodiment according to the invention will be described.

In the first embodiment, an example is illustrated in which the colorimetry processing is carried out based on the measurement results measured by the measurement unit 172. In contrast, the embodiment differs from the first embodiment on the feature of the measurement results measured by the measurement unit being further corrected in response to the distance between the medium and the spectrometer, and the colorimetry processing being carried out based on the measurement results.

Figure 13:
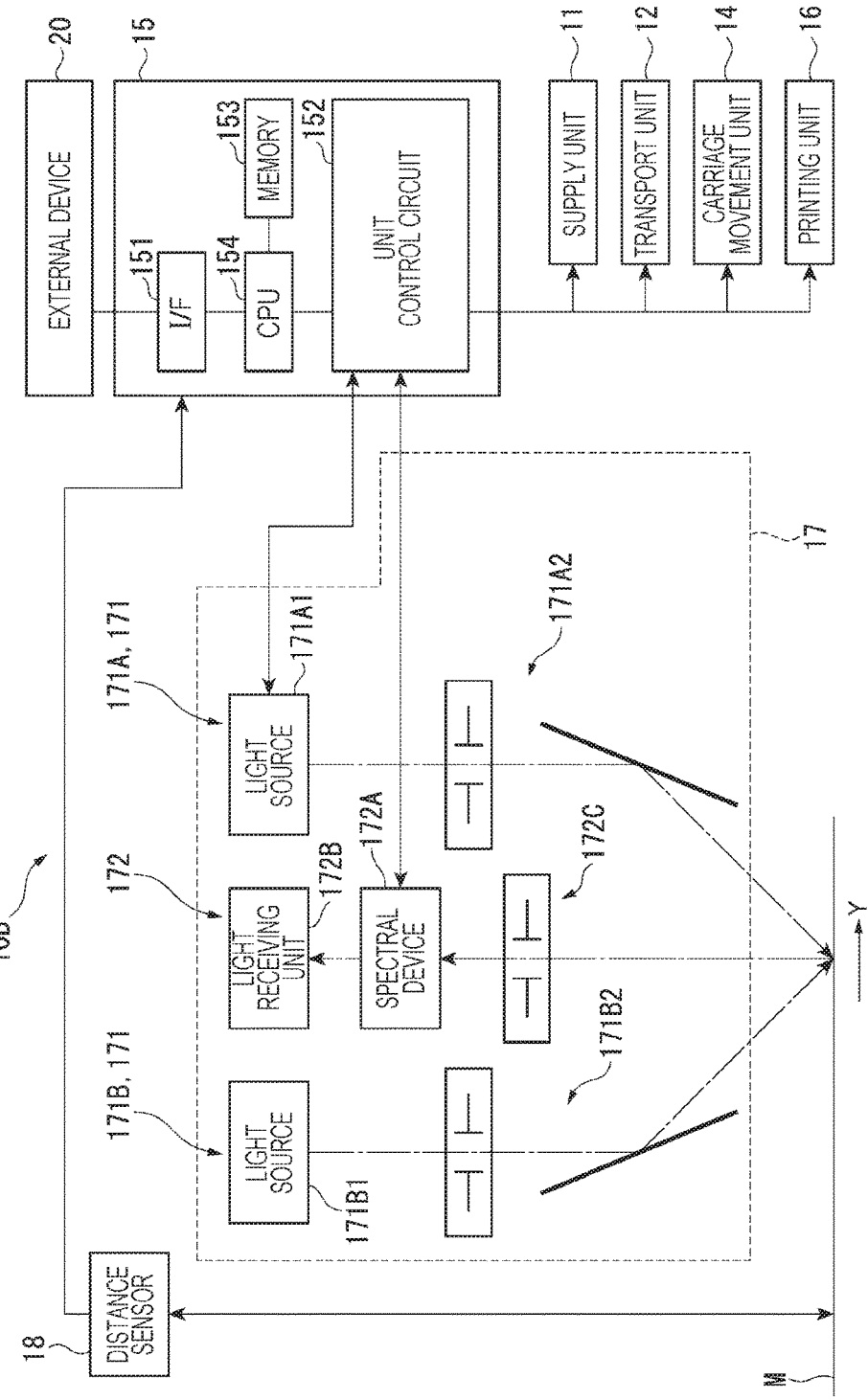
FIG. 13 is a block diagram illustrating a schematic configuration of a printer of a third embodiment.

FIG. 13 is a block diagram illustrating a schematic configuration of a printer of the third embodiment.

In the embodiment, a printer 10B is provided with a supply unit 11, a transport unit 12, a carriage 13, a carriage movement unit 14, and a control unit 15, similarly to the first embodiment. In the embodiment, a distance sensor 18 is provided on the carriage 13 in addition to the printing unit 16 and the spectrometer 17, as illustrated in FIG. 13. The distance sensor 18 may be incorporated in the spectrometer 17.

The distance sensor 18 is a distance measurement unit of the invention and is provided with the printing unit 16 and the spectrometer 17 on the carriage 13. For example, light from the light source is received by a Position Sensing Device (PSD) so that the distance sensor 18 can use a sensor that calculates a distance using trigonometry or the like. In addition, as the distance sensor 18, a distance-measurement type distance sensor may be used. For example, a distance sensor, in which a laser light is separated into a reference light and a measurement light, a distance is calculated based on combined interference fringes obtained by combining the measurement light reflected on the medium M and the reference light, may be used.

In a case where the optical type distance sensor 18 is used, it is preferable that the illumination light of the light source unit 171 of the spectrometer 17 be used. In this case, for example, even if swelling occurs in the medium M due to cockling or the like, the distance between the medium M and the spectrometer 17 is measured in the measurement region $A_D$ in which the spectral measurement is carried out by the spectrometer 17.

Distance-light quantity data is stored in the memory 153 in the control unit 15 of the embodiment. The distance-light quantity data is data indicating the relationship of the light quantity fluctuation amount in the measurement region $R_D$ with respect to the distance between the medium M and the spectrometer 17.

The colorimetry unit 154D measures the chromaticity with respect to the measurement region $A_D$ based on the received light quantity with respect to light with a plurality of wavelengths obtained by the spectral measurement processing, similarly to the first embodiment. In addition thereto, the colorimetry unit 154D of the embodiment functions as a correction unit of the invention, corrects the colorimetry results based on the distance measured by the distance sensor 18 and measures the chromaticity based on the corrected colorimetry results.

Spectral Measurement Method

Next, the spectral measurement method in the printer 10B of the embodiment will be described based on the drawings.

Figure 14:
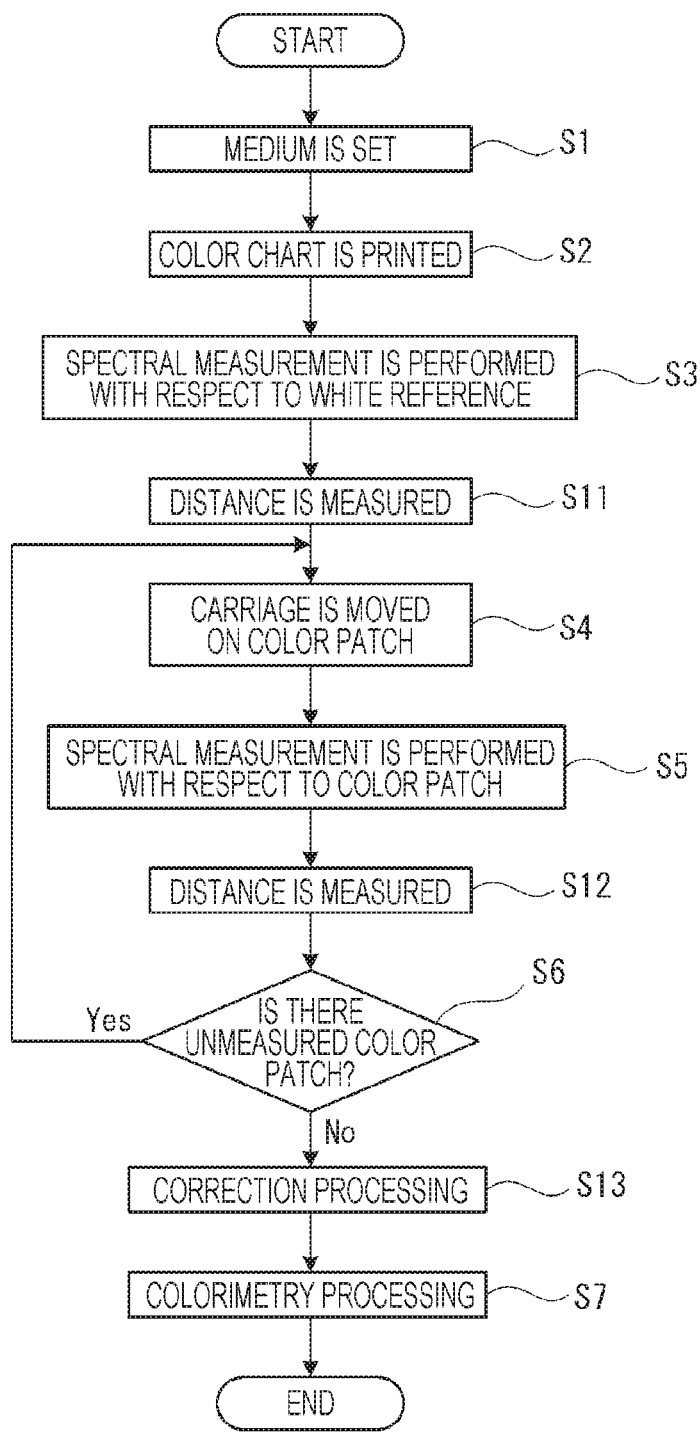
FIG. 14 is a flowchart illustrating a spectral measurement method in the printer in the third embodiment.

FIG. 14 is a flowchart illustrating the spectral measurement method in the printer 10B.

In the embodiment, the spectral measurement is carried out with respect to the color patch by substantially the same method as the spectral measurement method of the first embodiment as illustrated in FIG. 9.

That is, as illustrated in FIG. 14, the color chart 3 having the color patches 31 is formed by processing of step S1 and step S2, and the spectral measurement is carried out with respect to the white reference by processing of step S3. Thereafter, in the embodiment, a distance between the white reference and the spectrometer 17 is measured by the distance sensor 18 at a position at which the measurement of the white reference is carried out (step S11). The measurement control unit 154C stores the received light quantity (reference light quantity) measured in step S3 and the distance obtained in step S11 in the memory 153 in association with the measurement wavelength (or a voltage applied to the electrostatic actuator 56).

The measurement control unit 154C carries out the spectral measurement with respect to the color patch 31 in step S4 and step S5, and then the distance between the medium M and the spectrometer 17 measured by the distance sensor 18 is acquired in synchronization with acquisition timing of the received light quantity in step S5 (step S12). The measurement control unit 154C stores the received light quantity (measurement light quantity) measured in step S5 and the distance acquired in step S12 in the memory 153 in association with the measurement wavelength (or the voltage applied to the electrostatic actuator 56).

Processing from step S4 to step S12 is repeated until "No" is determined in step S6. If "No" is determined, in step S6, the colorimetry unit 154D corrects the reference light quantity that is measured in step S3 and the measurement light quantity that is measured in step S5 based on the distance-light quantity data stored in the memory 153 (step S13).

Hereinafter, the light quantity correction by the colorimetry unit 154D will be described.

In the embodiment, similarly to the first embodiment, when the medium M is positioned at the reference position $P_0$, in a case where the first illumination center $L_{A0}$ and the second illumination center $L_{B0}$ are positioned at positions different from the measurement center $D_0$, and the distance between the medium M and the spectrometer 17 fluctuates, any one of the first illumination center $L_A$ and the second illumination center $L_B$ approaches the measurement center D. Therefore, it is possible to suppress fluctuations in the received light quantity (total received light quantity) incident on the light receiving unit 172B of the measurement unit 172, and high precision measurement results can be obtained. However, as illustrated in FIG. 8, the received light quantity received by the light receiving unit 172B is slightly changed by the distance between the medium M and the spectrometer 17.

In contrast, in the embodiment, the distance-light quantity data that indicates the changes in the received light quantity by the light receiving unit 172B with respect to the distance between the medium M and the spectrometer 17 is stored in the memory 153, and correction is carried out based on the distance-light quantity data.

Figure 15:
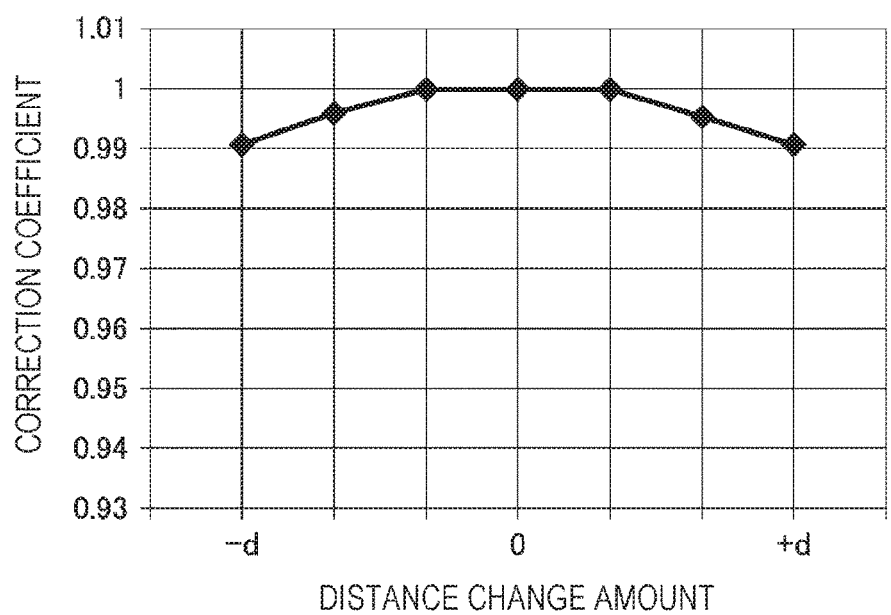
FIG. 15 is a drawing illustrating an example of distance-light quantity data in the third embodiment.

FIG. 15 is a drawing illustrating an example of the distance-light quantity data in the embodiment.

Specifically, as illustrated in FIG. 15, in the distance-light quantity data, a change ratio (below, may be referred to as correction coefficient) of the received light quantity by the light receiving unit 172B with respect to the change amount Δd (displacement amount in the Z direction from the reference position $P_0$ of the medium M) of the distance between the medium M and the spectrometer 17 is stored. The distance-light quantity data is provided for each measurement wavelength. For example, since spectral measurement is carried out with respect to 16 bands of measurement wavelengths in the visible light range (400 nm to 700 nm) in the embodiment, the distance-light quantity data is stored in the memory 153 for each of the 16 bands of measurement wavelengths.

It should be noted that, although FIG. 15 illustrates an example of the distance-light quantity data in which the correction coefficient is recorded with respect to the distance change amount, the correction coefficient may be recorded for the distance between the medium M and the spectrometer 17.

In step S13, the colorimetry unit 154D acquires the correction coefficient (light quantity change rate) in response to the distance acquired in step S11 from the distance-light quantity data, and calculates the correction reference amount in which the reference light quantity measured in step S3 is divided by the correction coefficient. Similarly, the correction coefficient is acquired in response to the distance acquired in step S12 from the distance-light quantity data, and the correction measurement light quantity in which the measurement light quantity measured in steps S5 is divided by the correction coefficient.

Thereafter, the colorimetry unit 154D carries out the colorimetry processing of step S7 similar to the first embodiment.

Actions and Effects of the Embodiment

The spectrometer 17 and the distance sensor 18 are mounted on the carriage 13 in the printer 10B of the embodiment. The colorimetry unit 154D uses the distance between the medium M and the spectrometer 17 measured by the distance sensor 18, and corrects the received light quantity with respect to each wavelength obtained by means of spectral measurement using the spectrometer 17. Accordingly, since it is possible to correct the received light quantity in response to the distance even in a case where the distance between the medium M and the spectrometer 17 fluctuates, it is possible to carry out a high precision colorimetry processing with respect to the color patch that is a measurement target based on the received light quantity.

Other Embodiments

It should be noted that the present invention is not limited to each of the above-described embodiments, and configurations obtained, as appropriate, according to modifications, improvements, and combinations of the embodiments within a scope capable of achieving the object of the invention are also included in the invention.

For example, although in each embodiment described above, a configuration, in which the medium M is an opaque member or a transparent member, and light reflected by the medium M is incident on the spectrometer 17, is illustrated, the invention is not limited thereto. In a case where the medium M of the translucent member is measured, or in a case where the transmitted light passing through the translucent member is measured, the light source unit 171 or the measurement unit 172 may be provided on the platen 122 side. However, in this case, as the carriage 13 moves, a moving mechanism for moving the light source unit 171 or the measurement unit 172 provided on the platen 122 side in the movement direction of the carriage 13 is required.

In the first embodiment described above, as a plurality of light sources included in the light source unit 171, although an example, in which two light sources of the first light source unit 171A and the second light source unit 171B are provided, is illustrated, there is no limitation thereto. For example, three or more light sources may be provided.

For example, in a case where three light sources (first light source unit, a second light source unit, and a third light source unit) are provided, the first light source unit, the second light source unit, and the third light source unit are disposed so as to be rotation objects and to have an interval of 120° around the measurement center when viewed from the normal direction of the measurement object M. Therefore, each illumination optical axis is configured such that when the medium M is positioned at the first position $P_1$, the first illumination center by the first light source unit matches the measurement center on the media, when the medium M is positioned at the second position $P_2$, the second illumination center by the second light source unit matches the measurement center on the media, and when the medium M is positioned at the reference position $P_0$, the third illumination center by the third light source unit matches the measurement center on the media. In such a configuration, similar to the first embodiment described above, in a case where the medium M moves from the reference position $P_0$ to the first position $P_1$, it is possible to suppress reduction of the light quantity in the measurement region by the light quantity of the illumination light of the first light source unit, and in a case where the medium M moves from the reference position $P_0$ to the second position $P_2$, it is possible to suppress reduction of the light quantity in the measurement region by the light quantity of the illumination light of the second light source unit. Furthermore, in the first embodiment described above, when the medium M is positioned at the reference position $P_0$, the first illumination center and the second illumination center are shifted from the measurement center, but in the modification example, since a third illumination center by the third light source unit matches the measurement center, light distribution when the medium M is applied to the reference position $P_0$ can be made more uniform and further improvement in the measurement precision can be achieved.

Figure 16:
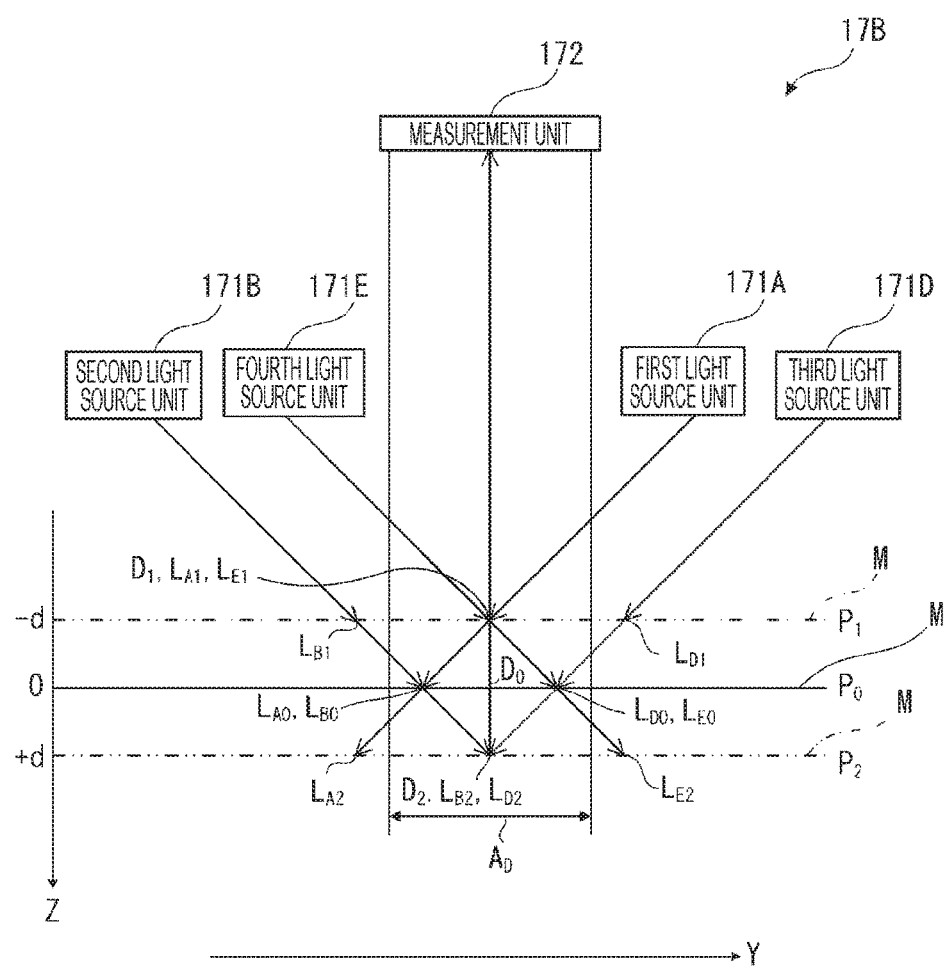
FIG. 16 is a drawing illustrating positions of an illumination region and a measurement region in an YZ plane in a case where a distance between media and a spectrometer fluctuates in another embodiment.

In a case where four light sources are provided, for example, as illustrated in FIG. 16, it is preferable that the four light sources be disposed along the Y direction.

That is, in the spectrometer 17B illustrated in FIG. 16, the light source unit includes a first light source unit 171A, a second light source unit 171B, a third light source unit 171D, and a fourth light source unit 171E.

Among them, similar to the first embodiment, when the first light source unit 171A is disposed on the +Y side of the measurement unit 172 and the medium M is positioned at the first position $P_1$, the illumination light is applied so that the measurement center $D_1$ and the first illumination center $L_{A1}$ match.

Similar to the first embodiment, when the second light source unit 171B is also disposed on the -Y side of the measurement unit 172 and the medium M is positioned at the second position $P_2$, the illumination light is applied so that the measurement center $D_2$ and the second illumination center $L_{B2}$ match.

Similar to the first light source unit 171A, the third light source unit 171D is disposed on the +Y side of the measurement unit 172. When the medium M is positioned at the second position $P_2$, the third light source unit 171D radiates the illumination light so that the third illumination center $L_{D2}$ that is the intersection point between the optical axis of the third light source unit 171D and the medium M is matched to the measurement center $D_2$.

Similar to the second light source unit 171B, the fourth light source unit 171E is disposed on the -Y side of the measurement unit 172. When the medium M is positioned at the first position $P_1$, the fourth light source unit 171E radiates the illumination light so that the fourth illumination center $L_{E2}$ that is the intersection point between the optical axis of the fourth light source unit 171E and the medium M is matched to the measurement center $D_2$.

In modification example of FIG. 16 described above, the first light source unit 171A, the second light source unit 171B, the third light source unit 171D, and the fourth light source unit 171E are disposed along the Y direction. Therefore, even if the distance between the medium M and the spectrometer 17B fluctuates, the illumination region by the light source units does not move along the X direction. Therefore, the illumination light is prevented from entering the other color patch 31 adjacent to the color patch 31 that is the measurement target and it is possible to suppress lowering of the measurement precision.

In the first embodiment, when the medium M is positioned at the reference position $P_0$, the first illumination center $L_{A0}$ and the second illumination center $L_{B0}$ are positioned on the -Y side of the measurement center $D_0$, and the light quantity distribution with respect to the measurement region $A_D$ is biased to the -Y side. In contrast, in the spectrometer 17B illustrated in FIG. 16, the first illumination center $L_{A0}$ and the second illumination center $L_{B0}$ are positioned on the -Y side of the measurement center $D_0$, and the third illumination center $L_{D0}$ and the fourth illumination center $L_{E0}$ are positioned on the +Y side. Therefore, in the measurement region $A_D$, the light quantity distribution is not biased to one side. The same is true when the medium M is positioned at the first position $P_1$, the light quantity is not biased to the +Y side or the -Y side of the measurement region $A_D$, and it is possible to apply the illumination light with substantially a uniform light quantity to the entire measurement region $A_D$.

In the above description, although an example, in which three or more light sources are provided as the light source unit 171 with respect to the first embodiment, is illustrated, the same is applied to the second embodiment, and three or more plural measurement units may be provided as the measurement unit.

In a case where three measurement units are provided, for example, when the medium M is positioned at the reference position $P_0$, the third measurement unit having the measurement region around the illumination center $L_{C0}$ as the measurement center may be provided.

In a case where four measurement units are provided, the first measurement unit and the third measurement unit are provided on the +Y side of the light source unit 171C, and the second measurement unit and the fourth measurement unit are provided on the -Y side. The measurement region of each measurement unit may be set so that when the medium M is positioned at the first position, the measurement centers of the first measurement unit and the fourth measurement unit are matched to the illumination center, and when the medium M is positioned at the second position, the measurement centers of the second measurement unit and the third measurement unit are matched to the illumination center.

In the first embodiment described above, although an example, in which when the medium M is positioned at the first position $P_1$ approaching the spectrometer 17 by a predetermined dimension, the illumination light is emitted from the first light source unit 171A so that the first illumination center $L_{A1}$ is matched to the measurement center $D_1$, is illustrated, there is no limitation thereto. That is, the medium M is positioned at the first position $P_1$, the first illumination center $L_{A1}$ is not necessarily matched to the measurement center $D_1$. For example, when the medium M is positioned at the first position $P_1$, the first illumination center $L_{A1}$ may be positioned at a position (for example, a position of ±Y side or ±X side) slightly shifted from the measurement center $D_1$.

The same is true to the second illumination center $L_B$ and, for example, when the medium M is positioned at the second position $P_2$ separated from the spectrometer 17 by a predetermined dimension, the second illumination center $L_{B2}$ may be positioned at a position slightly shifted on the +Y side from the measurement center $D_2$ or may be positioned at a position slightly shifted on the -Y side.

In the first embodiment described above, although an example, in which the first light source unit 171A and the second light source unit 171B are disposed with the measurement unit 172 interposed therebetween, and the illumination light is applied toward each measurement center (so as to face each other), is illustrated, there is no limitation thereto.

For example, in FIG. 16, only the first light source unit 171A and the third light source unit 171D are provided, and the second light source unit 171B and the fourth light source unit 171E may not be provided. Also in this case, in a case where the medium M is positioned at the first position $P_1$, the first illumination center $L_{A1}$ of the first light source unit 171A is matched to the measurement center $D_1$, and in a case where the medium M is positioned at the second position $P_2$, the third illumination center $L_{D2}$ of the third light source unit 171D is matched to the measurement center $D_2$. In a case where the medium M is positioned at the reference position $P_0$, the first illumination center $L_{A0}$ is positioned on the −Y side and the third illumination center $L_{D0}$ is positioned on the +Y side with the measurement center $D_0$ interposed therebetween. Therefore, the light quantity distribution is also uniform in the measurement region $A_D$. Therefore, similar to the embodiments described above, it is possible to carry out the measurement with high precision.

In each embodiment described above, although an example, in which the light source unit and the measurement unit are arranged along the Y direction, is illustrated, there is no limitation thereto, and, for example, the light source unit and the measurement unit may be arranged along the X direction. For example, in a case where a plurality of color patches elongated in the X direction are formed by the printing unit 16 and the spectral measurement is performed with respect to the color patches, as described above, it is preferable that the measurement unit and the light source unit be disposed along the X direction.

In the first embodiment described above, the 45/0° colorimetry system is illustrated and in the second embodiment described above, the 0/45° colorimetry system is illustrated, but the invention is not limited to the colorimetry systems according to the colorimetry standards described above. For example, it is possible to apply to any colorimetry system in which the illumination light is incident at arbitrary angle θ with respect to the normal line of the medium M and light that is reflected by or passes through the medium M at arbitrary angle θ is measured by the measurement unit.

In the third embodiment, although the colorimetry unit 154D calculates the correction reference light quantity in which the reference light quantity is divided by the correction coefficient in response to the distance, calculates the correction measurement light quantity in which the measurement light quantity is divided by the correction coefficient in response to the distance, and calculates the reflectivity based on the correction reference light quantity and the correction measurement light quantity, there is no limitation thereto. For example, the colorimetry unit 154D may calculate the reflectivity $R_\lambda$ using $R_\lambda = k_0 E_\lambda / k_1 E \lambda_0$ using the reference light quantity $E_{\lambda,0}$ and the measurement light quantity $E_\lambda$, where the correction coefficient with respect to the distance when the reference light quantity is measured is $k_{\lambda,0}$, and the correction coefficient with respect to the distance when the measurement light quantity is measured is $\lambda_{\lambda,1}$.

In the third embodiment described above, although the distance-light quantity data is provided with respect to each measurement wavelength, the colorimetry unit 154D acquires the correction coefficient from the distance-light quantity data according to the measurement wavelength, there is no limitation thereto. For example, the fluctuation rate in the total light quantity of the illumination light radiated from the light sources 171A1 and 171B1 with respect to the distance (for example, the displacement amount from the reference position $P_0$) between the medium M and the spectrometer 17 may be recorded. In this case, one item of distance-light quantity data may be stored in the memory 153.

In each of the above-described embodiments, although an example of a configuration in which the unit control circuit 152 is provided in the control unit 15, each control unit may be provided in each unit separately to the control unit 15, as described above. For example, a configuration may be used in which a filter control circuit that controls the variable wavelength interference filter 5 in the spectrometer 17 and a light reception control circuit that controls the light receiving unit 172B are provided. A microcomputer or a storage memory in which the V-λ data is stored is built into the spectrometer 17, and the microcomputer may function as the measurement control unit 154C.

Although as example in which an ink jet printing unit 16 that causes ink supplied from the ink tank to be discharged by a piezoelectric element being driven is given as an example of the printing unit 16 in each of the above-described embodiments, there is no limitation thereto. For example, a configuration that generates air bubbles in the ink by means of a heater, thereby discharging ink or a configuration in which ink is discharged by an ultrasonic oscillator may be used as the printing unit 16.

It is possible to apply the invention to any printing type of printer such as s thermal printer using a heat transfer method, a laser printer, a dot impact printer, without being limited to the ink jet type.

In each of the above-described embodiments, although an example of a light transmissive type variable wavelength interference filter 5 through which light with a wavelength corresponding to the gap G between the reflection films 54 and 55 from the incident light is allowed to pass is given as the variable wavelength interference filter 5, there is no limitation thereto. For example, a reflection-type variable wavelength interference filter may be used by which light with a wavelength corresponding to the gap G between the reflection films 54 and 55 is reflected. Another type of variable wavelength interference filter may be used.

In each of the above-described embodiments, although an example in which a spectral device 172A in which the variable wavelength interference filter 5 is stored in the housing 6 is given, a configuration in which the variable wavelength interference filter 5 is direction provided in the spectrometer 17 may be used.

Although the variable wavelength interference filter 5 is given as an example of the spectral element, there is no limitation thereto. For example, a grating, AOTF, LCTF or the like may be used as the spectral element.

In each of the above-described embodiments, although an example of a configuration (rear spectrometry) in which the spectral device 172A provided with the variable wavelength interference filter 5 is provided in the measurement unit 172, there is no limitation thereto.

For example, a configuration (front spectrometry) in which a variable wavelength interference filter 5 or a spectral device 172A provided with a variable wavelength interference filter 5 is disposed in the light source unit 171, and that irradiates the medium M with light divided by the variable wavelength interference filter 5 may be used.

In each of the above-described embodiments, although an example of a printer 10 provided with a spectral measurement device is given, there is no limitation thereto. For example, a spectral measurement device that is not provided with the image forming unit and that carries out only the colorimetry processing with respect to the medium M may be used. The spectral measurement device of the invention may be incorporated in a quality inspection device that performs quality inspection on a printed matter than manufactured in a factory or the like, and in addition, the spectral measurement device of the invention may be incorporated in any device.

In each of the above-described embodiments, although the first direction is the X direction, and the second direction is the Y direction orthogonal to the X direction, there is no limitation thereto. The X direction that is the first direction and the Y direction that is the second direction are not limited to orthogonal but may be directions intersecting, for example, at an angle of 60° or the like.

Although an example of a configuration in which the carriage 13 is moved along the X direction as the carriage movement unit 14 is provided, for example, the carriage 13 is fixed and the medium M may be moved in the X direction. That is, a moving mechanism that relatively moves the carriage 13 with respect to the medium M may be provided.

Additionally, specific structures when carrying out the invention may be formed by combining, as appropriate, the embodiments and modification examples within a scope able to achieve the advantages of the invention, and or other structures and the like may be changed, as appropriate.

The entire disclosure of Japanese Patent Application No. 2016-101385, filed May 20, 2016 is expressly incorporated by reference herein.

What is claimed is:

1. A measurement device comprising:
    first and second light sources configured to-radiate first and second illumination directly onto a medium sheet, respectively, the first and second light sources being spaced apart from each other in a first direction;
    the first illumination light having a first optical axis at a first light incident angle with respect to the medium sheet;
    the second illumination light having a second optical axis at a second light incident angle with respect to the medium sheet;
    the first and second light incident angles being different from each other; and
    the first and second optical axes intersecting each other at a first point on the medium sheet when the medium sheet is located at a reference position; and
    a light receiver configured to receive first and second measurement lights created from only an irradiated measurement region of the medium sheet, a center of the irradiated measurement region corresponding to a measurement center in a plan view, the first and second measurement lights respectively corresponding to one of:
        first and second reflection lights that are obtained by reflecting the first and second illumination lights from the irradiated measurement region of the medium sheet; and
        first and second transmitted lights that are obtained by passing the first and second illumination lights through the irradiated measurement region of the medium sheet,
    wherein, when the medium sheet is positioned at the reference position, the measurement center is offset from the first point on the medium sheet, and the measurement center and the first point are on a first line extending in the first direction, and
    the light receiver is sandwiched between the first and second light sources in the first direction when viewed from a normal direction of the medium sheet.

2. The measurement device according to claim 1, wherein the first point is located inside the irradiated measurement region when viewed from the normal direction of the medium sheet.

3. The measurement device according to claim 1, wherein the first light source, the light receiver, and the second light source are located on the first line when viewed from the normal direction of the medium sheet.

4. The measurement device according to claim 1, wherein, when the medium sheet is positioned at a position closer to the light receiver by a first predetermined dimension along the normal direction of the medium sheet from the reference position, a first illumination center at which the first optical axis of the first illumination light and the medium sheet intersect is located at the measurement center.

5. The measurement device according to claim 1, wherein, when the medium sheet is positioned at a position further from the light receiver by a second predetermined dimension along the normal direction of the medium sheet from the reference position, a second illumination center at which the second optical axis of the second illumination light and the medium sheet intersect is located at the measurement center.

6. The measurement device according to claim 1, further comprising:
    a carriage on which the first and second light sources and the light receiver are mounted; and
    a moving mechanism that is configured to relatively move the carriage with respect to the medium sheet in a moving direction,
    wherein the first and second optical axes of the first and second illumination lights impinge upon the medium sheet on the first line when viewed from the normal direction of the medium sheet, and the moving direction is perpendicular to the first direction.

7. A measurement device comprising:
    a light source that radiates an illumination light directly onto a medium sheet, an optical axis of the illumination light impinging upon a first point on the medium sheet when the medium sheet is positioned at a reference position; and
    first and second light receivers configured to receive first and second measurement lights, respectively, created from only an irradiated measurement region of the medium sheet, the first and second light receivers being spaced apart from each other in a first direction, a center of the irradiated measurement region corresponding to a measurement center in a plan view, the first and second measurement lights respectively corresponding to one of:
        first and second reflection lights that are obtained by reflecting the illumination light from the irradiated measurement region of the medium sheet; and
        first and second transmitted lights that are obtained by passing the illumination light through the irradiated measurement region of the medium sheet,
    wherein, when the medium sheet is positioned at the reference position, the measurement center is offset from the first point on the medium sheet, and the measurement center and the first point are on a first line extending in the first direction, and the light source is sandwiched between the first and second light receivers in the first direction when viewed from a normal direction of the medium sheet.

8. A printing apparatus comprising:
an image forming member that forms an image on a medium sheet;
first and second light sources configured to radiate first and second illumination directly onto the medium sheet, respectively, the first and second light sources being spaced apart from each other in a first direction;
the first illumination light having a first optical axis at a first light incident angle with respect to the medium sheet;
the second illumination light having a second optical axis at a second light incident angle with respect to the medium sheet;
the first and second light incident angles being different from each other; and
the first and second optical axes intersecting each other at a first point on the medium sheet when the medium sheet is located at a reference position; and
a light receiver configured to receive first and second measurement lights created from only an irradiated measurement region of the medium sheet, a center of the irradiated measurement region corresponding to a measurement center in a plan view, the first and second measurement lights respectively corresponding to one of:
first and second reflection lights that are obtained by reflecting the first and second illumination lights from the irradiated measurement region of the medium sheet; and
first and second transmitted lights that are obtained by passing the first and second illumination lights through the irradiated measurement region of the medium sheet,
wherein, when the medium sheet is positioned at the reference position, the measurement center is offset from the first point on the medium sheet, and the measurement center and the first point are on a first line extending in the first direction, and
the light receiver is sandwiched between the first and second light sources in the first direction when viewed from a normal direction of the medium sheet.

9. The printing apparatus according to claim 8,
wherein the first point is located inside the irradiated measurement region when viewed from the normal direction of the medium sheet.

10. The printing apparatus according to claim 9, further comprising:
a carriage on which the image forming member, the first and second light sources, and the light receiver are mounted; and
a moving mechanism that relatively moves the carriage with respect to the medium sheet.

11. The printing apparatus according to claim 8,
wherein the first light source, the light receiver, and the second light source are located on the first line when viewed from the normal direction of the medium sheet.

12. The printing apparatus according to claim 11, further comprising:
a carriage on which the image forming member, the first and second light sources, and the light receiver are mounted; and
a moving mechanism that relatively moves the carriage with respect to the medium sheet.

13. The printing apparatus according to claim 8,
wherein, when the medium sheet is positioned at a position closer to the light receiver by a first predetermined dimension along the normal direction of the medium sheet from the reference position, a first illumination center at which the first optical axis of the first illumination light and the medium sheet intersect is located at the measurement center.

14. The printing apparatus according to claim 13, further comprising:
a carriage on which the image forming member, the first and second light sources, and the light receiver are mounted; and
a moving mechanism that relatively moves the carriage with respect to the medium sheet.

15. The printing apparatus according to claim 8,
wherein, when the medium sheet is positioned at a position further from the light receiver by a second predetermined dimension along the normal direction of the medium sheet from the reference position, a second illumination center at which the second optical axis of the second illumination light and the medium sheet intersect is located at the measurement center.

16. The printing apparatus according to claim 15, further comprising:
a carriage on which the image forming member, the first and second light sources, and the light receiver are mounted; and
a moving mechanism that relatively moves the carriage with respect to the medium sheet.

17. The printing apparatus according to claim 8, further comprising:
a carriage on which the first and second light sources and the light receiver are mounted; and
a moving mechanism that is configured to relatively move the carriage with respect to the medium sheet in a moving direction,
wherein the first and second optical axes of the first and second illumination lights impinge upon the medium sheet on the first line when viewed from the normal direction of the medium sheet, and the moving direction is perpendicular to the first direction.

18. The printing apparatus according to claim 8, further comprising:
a carriage on which the image forming member, the first and second light sources, and the light receiver are mounted; and
a moving mechanism that relatively moves the carriage with respect to the medium sheet.

* * * * *